(12) United States Patent
Satran et al.

(10) Patent No.: US 6,234,724 B1
(45) Date of Patent: May 22, 2001

(54) MODULAR CUTTING TOOL ASSEMBLY

(75) Inventors: Amir Satran, Kfar Vradim; Igor Varshavsky, Nesher; Yuri Men, Haifa, all of (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 09/319,430

(22) PCT Filed: Dec. 16, 1997

(86) PCT No.: PCT/IL97/00412

§ 371 Date: Jun. 7, 1999

§ 102(e) Date: Jun. 7, 1999

(87) PCT Pub. No.: WO98/26893

PCT Pub. Date: Jun. 25, 1998

(30) Foreign Application Priority Data

Dec. 16, 1996 (IL) .......................................... 119841

(51) Int. Cl.[7] .................................................. B23C 5/22
(52) U.S. Cl. ................ 407/43; 407/67; 407/70; 407/113; 407/64
(58) Field of Search .................... 407/113, 101, 407/102, 103, 107, 43, 47, 48, 53, 64, 65, 66, 67, 69, 70

(56) References Cited

U.S. PATENT DOCUMENTS

| | | |
|---|---|---|
| 1,459,805 | * 6/1923 | Tasker ............................. 407/103 X |
| 4,812,087 | 3/1989 | Stashko . |
| 5,199,827 | 4/1993 | Pantzar . |
| 5,236,288 | 8/1993 | Flueckiger . |
| 5,529,440 | * 6/1996 | Schmidt ................................. 407/113 |

FOREIGN PATENT DOCUMENTS

| | | |
|---|---|---|
| 3540665 | 11/1985 | (DE) . |
| 93 05 518 U | 4/1993 | (DE) . |
| 416 901 B1 | 9/1990 | (EP) . |
| 97/00750 | 6/1996 | (WO) . |
| 97/03779 | 7/1996 | (WO) . |
| 97/27018 | 1/1997 | (WO) . |

* cited by examiner

Primary Examiner—Henry Tsai
(74) Attorney, Agent, or Firm—Mark M. Friedman

(57) ABSTRACT

A modular cutting tool assembly includes a tool holder (50) having at least one insert receiving pocket (52) and first (10,80) second cutting (100,102) inserts alternately receivable within the pocket (52). The first cutting (10,80) insert has a peripheral flank surface (18) configured to provide abutment features with m×n-fold rotational symmetry about the insert's central axis so that it can be restrained against the lateral support surfaces (56,58,60) in any of mn× angular positions, for at least one value of each of n and m where $n \geq 3$ and $m \geq 2$. The second cutting (100,102) insert has a peripheral flank surface (110) configured to provide reduced-symmetry abutment features with only n-fold rotational symmetry so that the second cutting insert can be restrained against the lateral support surfaces in only n angular positions. The peripheral flank surface (18,110) of at least the first cutting insert is configured such that a lower cross-section taken through the lower part of the first cutting insert perpendicular to the central axis has a recessed form.

26 Claims, 23 Drawing Sheets

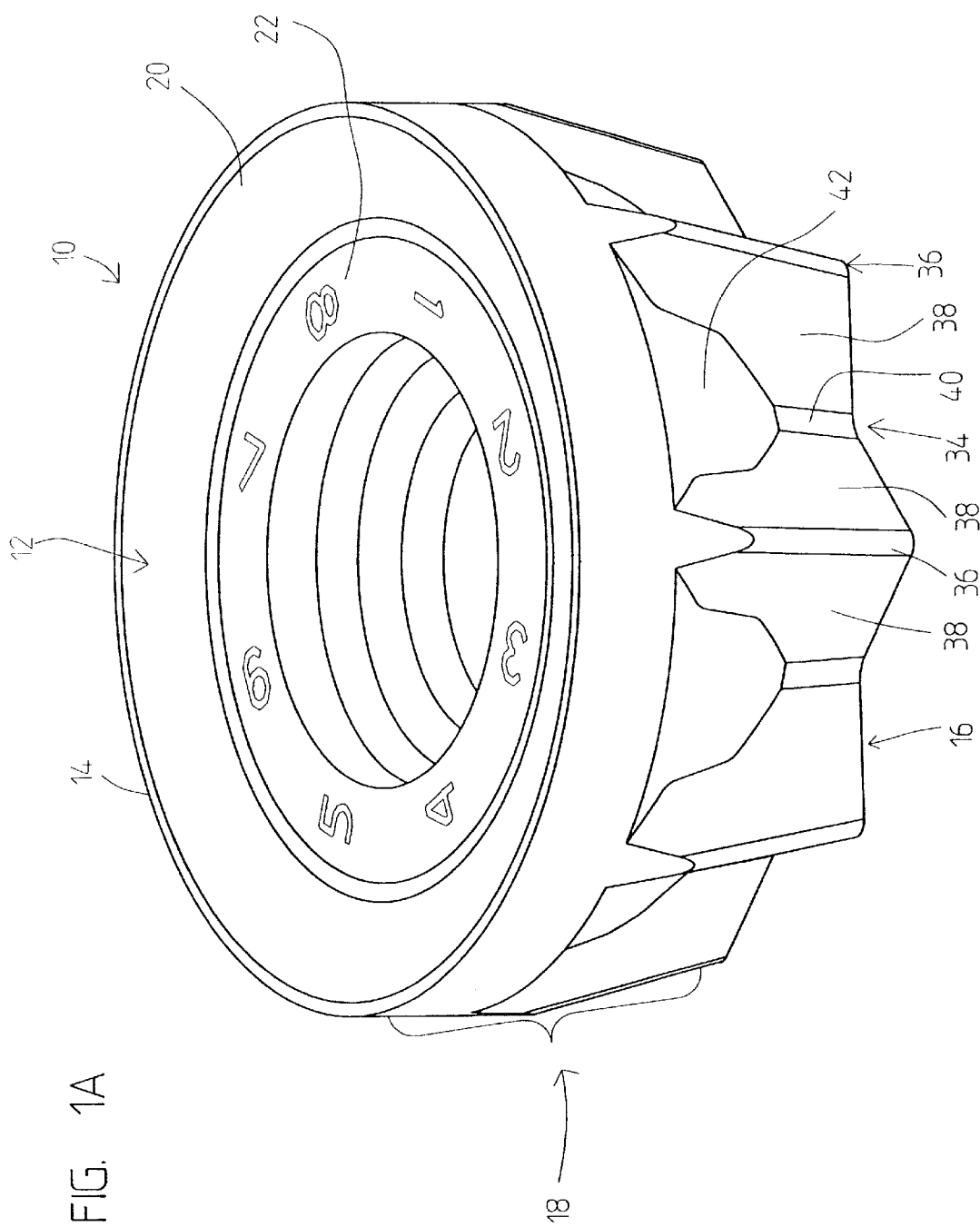

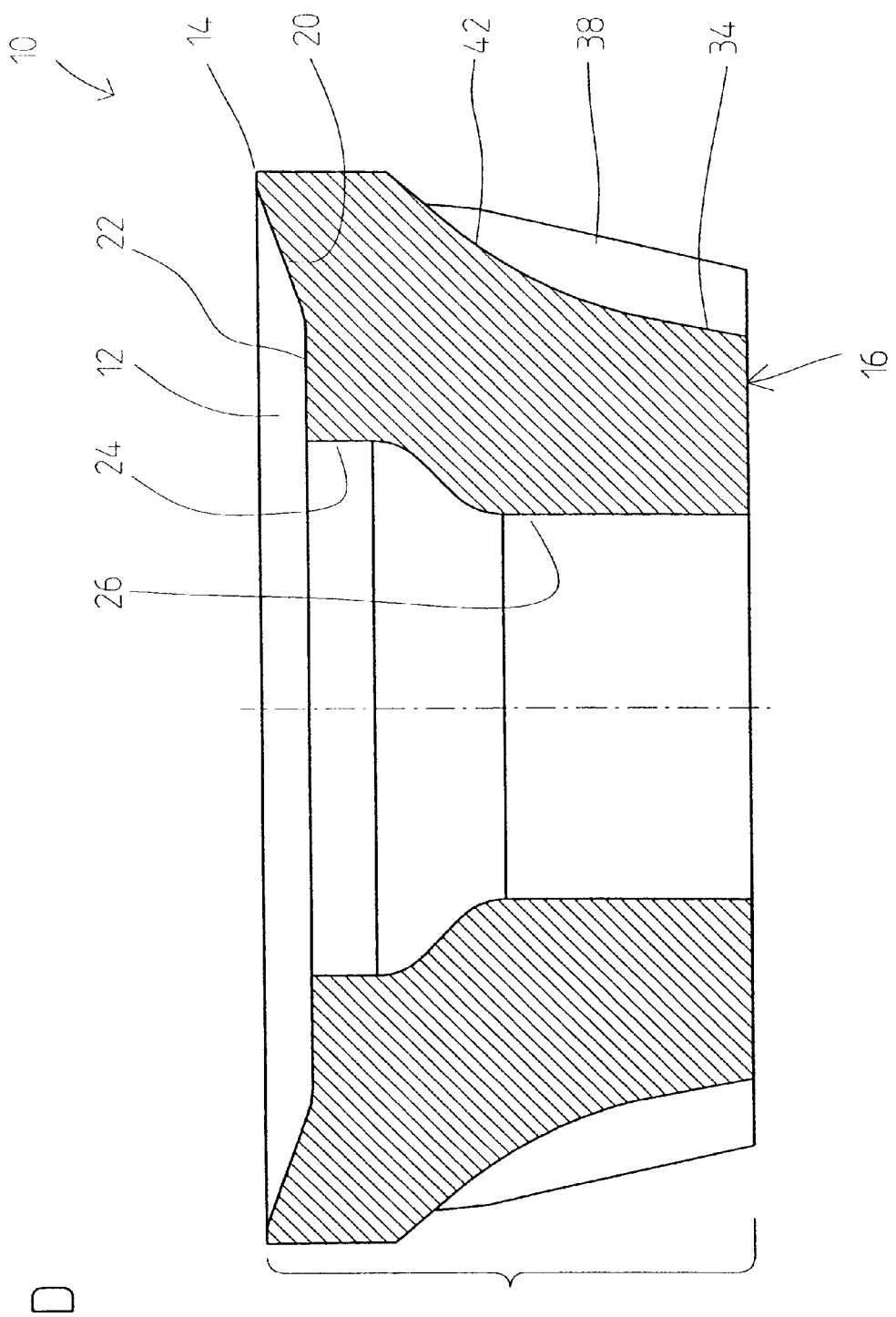

MODULAR CUTTING TOOL ASSEMBLY

FIELD AND BACKGROUND OF THE INVENTION

The present invention relates to cutting tools and, in particular, it concerns a modular cutting tool assembly in which cutting inserts with different orders of rotational symmetry can be used alternately with a single tool holder.

It is known to employ cutting inserts made of various hard materials which have round, polygonal, or otherwise rotationally symmetric cutting edges mounted in a receiving pocket of a tool holder of a cutting tool. During a machining operation (turning, milling, etc.), only a portion of the available cutting edge typically actually cuts the workpiece. The extent of this portion depends on the depth of cut. When a portion of an indexable cutting edge of a regular (e.g., polygonal) insert has been worked, the insert is indexed to present a whole new cutting edge.

In the case of cutting inserts with polygonal cutting edges, proper operation can only be achieved by rotationally securing the insert within the pocket so as to withstand the cutting forces generated during use. Conventional teaching has relied on abutment surfaces resulting from the inherent polygonal shape of the cutting insert. However, especially in high torque applications, or in polygons with large numbers of sides, the inherent abutment geometry may prove inadequate to withstand torques which may result from cutting forces.

Cutting inserts with round cutting edges exhibit rotational symmetry and could theoretically be continuously indexable in any angular position to accommodate actually observed wear. In practice, however, round inserts have also become restricted to use with a discrete number of indexing stations, angularly spaced by an equal shift angle. The angular shift between the indexing stations is referred to as the "angular pitch" of the insert.

In order to make optimal use of a round cutting insert, it is desirable to prevent rotation of the insert from its indexed position during the cutting process, thereby limiting the wear to a defined portion of the cutting edge. This ensures that the portion of the cutting edge presented after repositioning is, in fact, un-used.

A number of designs have been suggested for anchoring round inserts against rotation. These designs may be subdivided into two types, namely, "seat-pinning" and "lateral abutment". Examples of a seat-pinning design may be found in U.S. Pat. No. 5,296,288 to Flueckiger and European Patent Publication No. 300,172 to Stashko. The lateral abutment design is exemplified by U.S. Pat. No. 3,346,336 to Rescigno. All of these designs suffer from limited torque-resisting capability due to the poor size, location and orientation of the contact surfaces.

As will be clear from the above discussion, the requirements for effective restraining of a cutting insert are typically highly specific to the geometry of the cutting edge. Thus each type of insert, triangular, rectangular, square, or round, is provided with a dedicated tool holder design with a corresponding pocket shape. As a result, the use of multiple insert types is accompanied by the expense of providing and storing multiple tool holders, and necessitates the additional labor of exchanging the entire tool between cutting operations.

In an attempt to reduce these costs and labor, modular systems based on replaceable cartridges have been developed. Examples of such systems include the "Modulmill" system commercially available from SANDVIK Coromant and the "NOVEX F 2010" system commercially available from Montanwerke Walter GmbH. These systems employ replaceable adapter cartridges each of which provides a pocket with clamping geometry suited to a specific cutting insert. Although these systems do allow the primary tool holder to be used with different cutting insert types, the replacement of the cartridges still adds a wasteful additional dissembly/assembly step to the changeover.

There is therefore a need for a modular cutting tool assembly which allows alternate use of multiple cutting inserts with differing numbers of indexing positions within a single tool holder pocket. There is also a need for cutting inserts and tool holders for use in such an assembly.

SUMMARY OF THE INVENTION

The present invention provides a modular cutting tool assembly in which cutting inserts with various differing numbers of indexing stations or differing cutting geometries can be used alternately in a generic tool holder pocket structure.

According to one aspect of the present invention, the insert-receiving pocket is structured to provide circumscribing "three-point" locating and support features.

According to a further aspect of the invention, a reduced-symmetry cutting insert is provided with protruding features which inhibit erroneous indexing of the insert in an improper angular position.

The indexable inserts of the present invention may form part of a set of coordinated interchangeable inserts for use with a tool holder of a single size and shape. The inserts and receiving pockets of the invention are of great value in many applications including, but not limited to, milling cutters, broaches, turning tools and the like.

In one embodiment, the present invention provides an indexable insert which has a plurality of discrete abutment surfaces, three of which are used at a time.

According to the teachings of the present invention there is provided, a modular cutting tool assembly comprising: (a) a tool holder having at least one insert receiving pocket with a base and a plurality of lateral support surfaces; (b) a first cutting insert receivable within the pocket, the first cutting insert having an upper surface, a bottom surface and a peripheral flank surface, the peripheral flank surface being configured to provide abutment features with m×n-fold rotational symmetry about a central axis of the first cutting insert such that the first cutting insert can be restrained against the lateral support surfaces in any of m×n angular positions, for at least one value of each of n and i)i where $n \geq 3$ and $m \geq 2$; and (c) a second cutting insert receivable within the pocket, the second cutting insert having an upper surface, a bottom surface and a peripheral flank surface, the peripheral flank surface being configured to provide reduced-symmetry abutment features with only n-fold rotational symmetry about a central axis of the second cutting insert such that the second cutting insert can be restrained against the lateral support surfaces in only n angular positions, wherein the peripheral flank surface of the first cutting insert is configured such that a lower cross-section taken through the lower part of the first cutting insert perpendicular to the central axis exhibits a recessed form.

According to a further feature of the present invention, the peripheral flank surface of the first cutting insert is configured such that an upper cross-section through the first cutting insert perpendicular to the central axis and proximal to the upper surface exhibits a non-recessed form.

According to a further feature of the present invention, the upper cross-section corresponds to a substantially regular polygon with m×n sides.

According to a further feature of the present invention, the upper cross-section is substantially circular.

According to a further feature of the present invention, the peripheral flank surface of the second cutting insert is shaped such that a lower cross-section taken through the lower part of the second cutting insert perpendicular to the central axis at a point closer to the bottom surface exhibits a recessed form.

There is also provided according to the teachings of the present invention, a modular cutting tool assembly comprising, (a) a tool holder having at least one insert receiving pocket with a base and a plurality of lateral support surfaces, reference being made to a feed direction defined relative to the lateral support surfaces; (b) a first cutting insert receivable within the pocket, the first cutting insert having an upper surface bounded by a cutting edge, a bottom surface and a peripheral flank surface, the peripheral flank surface being configured to provide abutment features with n-fold rotational symmetry about a central axis of the first cutting insert such that the first cutting insert can be restrained against the lateral support surfaces in n angular positions, for at least one value of n where n≧3, the first cutting insert being configured such that, when mounted within the pocket, the first cutting insert presents a primary operative portion of the cutting edge at a first entering angle to the feed direction; and (c) a second cutting insert receivable within the pocket, the second cutting insert having an upper surface bounded by a cutting edge, a bottom surface and a peripheral flank surface, the peripheral flank surface being configured to provide abutment features with n-fold rotational symmetry about a central axis of the second cutting insert such that the second cutting insert can be restrained against the lateral support surfaces in n angular positions, the second cutting insert being configured such that, when mounted within the pocket, the second cutting insert presents a primary operative portion of the cutting edge at a second entering angle to the feed direction, the second entering angle being different from the first entering angle.

According to a further feature of the present invention, the first entering angle differs from the second entering angle by about 180°/n.

There is also provided according to the teachings of the present invention, a tool holder for alternately receiving a first cutting insert indexable in exactly n rotational positions and a second cutting insert indexable in m×n rotational positions, for at least one value of each of n and m where n>3 and m>2, the tool holder comprising at least one insert receiving pocket defined with reference to an axis passing through the pocket with which a central axis of the cutting inserts is to be aligned, the pocket having: (a) a base for supporting the cutting inserts; (b) first, second and third lateral support surfaces angularly spaced around, and substantially equidistant from the axis; (c) a first lateral hollow located between the first and second lateral support surfaces; and (d) a second lateral hollow located between the second and third lateral support surfaces, wherein the first and second lateral hollows are formed such that geometrical mappings of the first and second lateral support surfaces by rotation through 360°/(m×n) about the axis lie within the first and second lateral hollows, respectively.

According to a further feature of the present invention, the first, second and third lateral support surfaces define, respectively, first, second and third planes, the first plane being related to the second plane by a rotation through 360°/n about the axis.

According to a further feature of the present invention, the second and third planes of the pocket are substantially coplanar.

According to a further feature of the present invention, n=4 and m=2.

There is also provided according to the teachings of the present invention, a cutting insert having n-fold rotational symmetry for some value of n where n>3, the cutting insert being indexable exclusively at n indexing stations within an insert receiving pocket which is configured to receive alternately cutting inserts having both n-fold rotational symmetry and m×n-fold rotational symmetry for some value of 122 where m≧2, the cutting insert comprising a unitary structure having an upper surface bounded by a cutting edge, a base, a peripheral flank surface and a central axis, wherein the peripheral flank surface is shaped such that an outline of a first cross-section taken through the lower part of the cutting insert perpendicular to the central axis exhibits a recessed form including: (a) n corner portions angularly spaced around the central axis, the corner portions corresponding to n-fold rotationally symmetric lateral abutment features; and (b) support protrusions protruding outwards from the peripheral flank surface between the corner portions, wherein the support protrusions are shaped such that, under any geometrical mapping of an outline of the corner portions by rotation through an angle of less than 360°/n about the central axis, the support protrusions extend beyond the outline.

According to a further feature of the present invention, the peripheral flank surface is further shaped such that an outline of a second cross-section taken through the cutting insert perpendicular to the central axis and proximal to the upper surface exhibits a non-recessed form.

According to a further feature of the present invention, the corner portions correspond substantially to corner regions of a regular polygon of n sides.

BRIEF DESCRIPTION OF THE DRAWINGS

The invention is herein described, by way of example only with reference to the accompanying drawings, wherein:

FIG. 1A is a perspective view of a first preferred cutting insert, constructed and operative according to the teachings of the present invention, having a round cutting edge;

FIG. 1D is a side cross-sectional view taken along the line II—II of FIG. 1C;

DESCRIPTION OF THE PREFERRED EMBODIMENTS

Figure 1B:
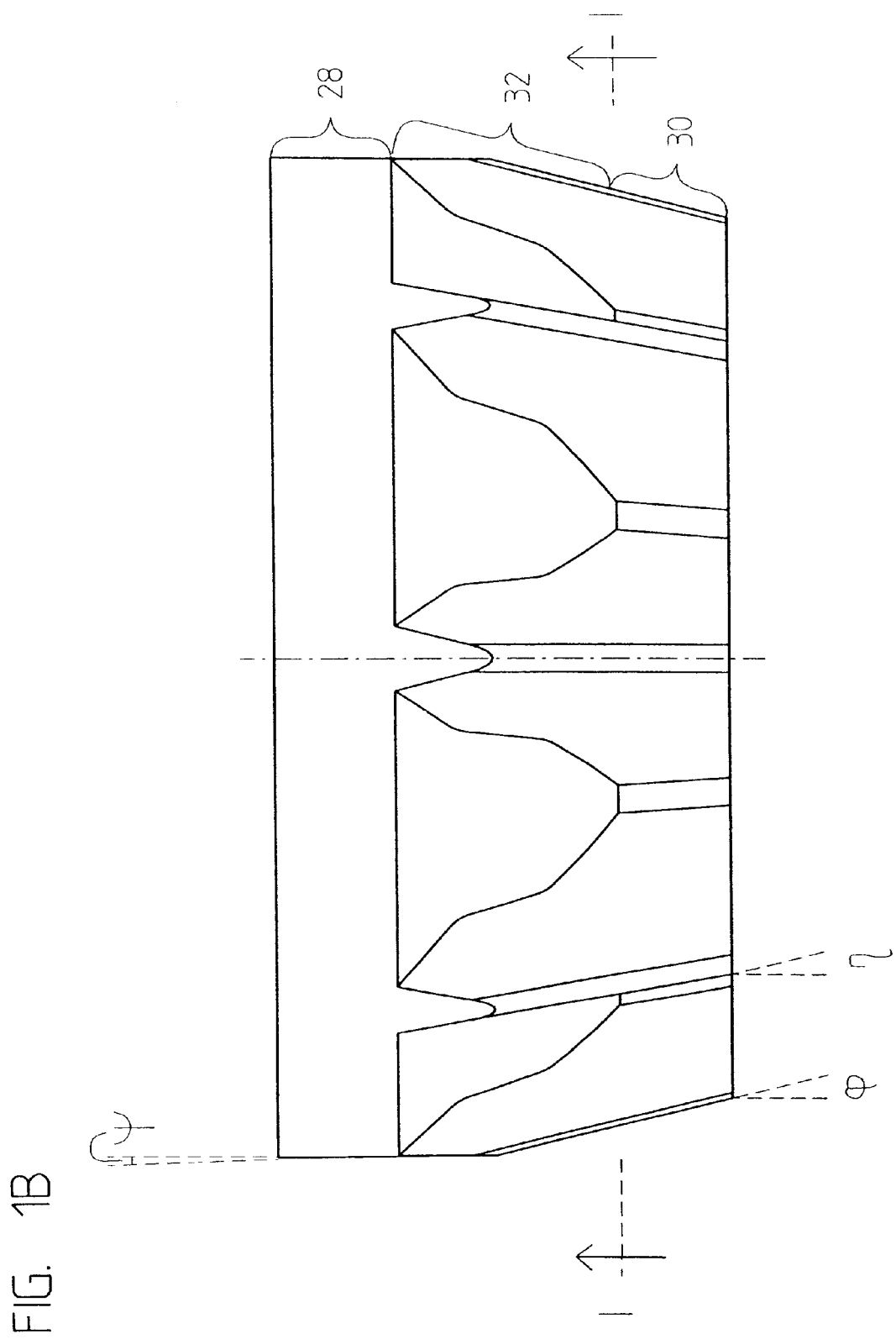
FIG. 1B is a side view of the cutting insert of FIG. 1A.

The present invention is a modular cutting tool assembly employing round and polygonal cutting inserts with peripheral flank surfaces shaped to provide abutment surfaces for opposing high torques and corresponding insert-receiving pockets of tool holders. The geometry of the abutment surfaces enables the use of sets of inserts with differing numbers of indexing positions and differing entering angles within a given pocket geometry.

The principles and operation of cutting tool assemblies, and their component cutting inserts and tool holders according to the present invention may be better understood with reference to the drawings and the accompanying description.

Referring now to the drawings, FIGS. 1A–1E show a first cutting insert, generally designated 10, constructed and operative according to the teachings of the present invention.

In general terms, cutting insert 10 has an upper surface 12 bounded by a cutting edge 14, a base 16, and a peripheral flank surface 18. The shape of peripheral flank surface 18 varies along the height of cutting insert 10. Near the top of peripheral flank surface 18, it conforms to the round or polygonal geometry of the cutting edge so as to provide support for cutting edge 14. Lower down cutting insert 10, peripheral flank surface 18 is shaped to provide transverse abutment surfaces, preferably with recessed features such as channels and in certain cases, as chevron-type channels. This latter possibility leads to a lower cross-sectional geometry which approximates to an n-pointed star.

The phrase "n-pointed star" as used in the specification and claims refers to a rotationally symmetric shape with n outermost points each of which is joined to its nearest neighbors by an inward pointing chevron or "V-shape". An example of a 5-pointed star is shown in FIG. 2B. It should be noted that the lower peripheral flank surfaces of certain preferred cutting inserts of the present invention are described as having "approximately" or "substantially" n-pointed star geometry since the points and/or the chevron bases may be flattened, as will be described in more detail below.

It should be appreciated that the present invention is applicable to a wide range of cutting inserts with rotationally-symmetric cutting edges. The term "rotationally-symmetric" is used herein in the description and claims to refer to shapes which are invariant under rotation through an angle of 360°/n where n is at least three. The term so defined includes regular polygons of three or more sides, whether straight-sided or made up of more complex combinations of straight or curved line segments. The term also includes circular shapes. Also included are variations on the above-mentioned shapes in which a repetitive pattern is superimposed over the basic shape. Examples of such patterns include serrations, and scalloped or wavy cutting edges. It will be noted that the symmetry of the inserts of the present invention, unless otherwise stated, is taken to refer to the symmetry of the abutment features. The cutting edge may exhibit equivalent or higher degrees of symmetry than the abutment surfaces.

It should also be appreciated that neither rotational symmetry nor n-pointed star geometry imply symmetry under reflection. In cases in which a specific cutting application generates torque primarily in one direction, the structures of the present invention may be constructed asymmetrically with abutment surfaces for opposing the primary torque component. However, the invention will be illustrated by way of example in the context of symmetrical embodiments for opposing torques in both senses about the central axis.

Reference will be made throughout the specification and claims to a central axis of an insert. The axis in question is the axis about which the cutting edge exhibits rotational symmetry,. Reference is also made to the "top" and "bottom" of the insert. Wherever such references appear, the insert is assumed to be mounted with its base downwards so as to present its cutting edge upwards and with its axis vertical.

The abutment surface geometry permits the use of these lower symmetry inserts within pockets also designed to receive higher symmetry cutting inserts. as will be described in more detail below. to Reference is made in the description and claims to recessed and non-recessed shapes. It should be understood that the term "recess" is used in the description and claims to refer to a part of a shape or surface which is concave or otherwise generates a hollow, in more precise terms, a recess may be identified as any part of a shape or surface which lies interior to a virtual straight line connecting adjacent parts of the shape or surface. Conversely, a shape which at no point has a recess so defined is termed a "non-recessed" shape. Thus, the chevron of an n-pointed star constitutes a "recess" as herein defined, whereas a regular polygon is classified as a non-recessed shape.

Turning now to the features of cutting insert 10 in more detail, upper surface or rake 12 has, in this example, an inwardly slanted, peripheral annular portion 20, bordered at the outer perimeter thereof by cutting edge 14, and a flat, inner annular portion 22, perpendicular to the axis of cutting insert 10.

Upper surface 12 may also have additional chip control features such as a pattern of indentations or ridges. One such possibility is shown in FIG. 1E. Again, it should be noted that the cutting insert is considered rotationally symmetric independent of the fact that the indices and various other features of the upper surface may not conform to this symmetry.

As can be best seen in FIG. 1D, inner annular portion 22 intersects at its inner extreme with a cylindrical extension 24 of a central, standard so-called "partly cylindrical" bore 26, used for the passage of a standard counter-sunk clamping screw (not shown). It should be appreciated that the specific clamping technique employed to clamp cutting insert 10 within a tool holder does not, per se, constitute a part of the present invention, and that variations may be made in accordance with any other clamping technique without straying from the scope of the present invention.

Turning now to peripheral flank surface 18, it is a particular feature of certain preferred cutting inserts of the present invention that peripheral flank surface 18 is shaped such that a first cross-section taken through the cutting insert perpendicular to the central axis and proximal to upper surface 12 is bounded by a non-recessed form, whereas a second cross-section taken through the cutting insert perpendicular to the central axis at a point closer to base 16 exhibits n-fold rotational symmetry and includes recessed features for providing abutment surfaces for opposing torque about the central axis.

To this end, peripheral flank surface 18 may be subdivided along the height of cutting insert 10 into at least two, and typically three, portions. A first portion adjacent to cutting edge 14 is denoted the relief flank surface 28 and has a non-recessed cross-sectional outline. The lower portion of peripheral flank surface 18 constitutes a ribbed flank surface 30. Ribbed flank surface 30 is preferably linked to relief flank surface 28 by a transition flank surface portion 32 which provides a gradual transition between the two forms, as will be described below. These portions provide features having abutment surfaces for opposing torque about the central axis.

Relief flank surface 28 typically corresponds to the geometry of the cutting edge employed. Thus, in cutting insert 10, relief flank surface 28 has a frustro-conical form, having a circular cross-section corresponding to the circular cutting edge illustrated. Thus, relief flank surface 28 may be described as having substantially constant cross-sectional geometry perpendicular to the central axis at all heights, although the dimensions of this geometry may vary somewhat with height. Relief flank surface 28 preferably extends downwards from cutting edge 14 at least about a tenth of the height of cutting insert 10.

Relief flank surface 28 is typically inclined at an acute angle $\psi$ relative to the central axis of cutting insert 10. Angle $\psi$ is commonly denoted the insert's "primary normal relief angle" and is preferably less than about 20° and typically about 7°. For a negative insert, $\psi$ may be about 0° such that relief flank surface 28 is cylindrical.

Turning now to the features of ribbed flank surface 30 in more detail, this is preferably implemented as a frustro-pyramidal ribbed surface with channels 34 formed between projecting ridges 36. Channels 34 preferably have a chevron-type cross-section.

Ribbed flank surface 30 extends from base 16 to a plane perpendicular to the insert axis indicated in FIG. 1B as plane I—I. Ribbed flank surface 30 preferably extends for at least about an eighth, and typically for at least about a quarter, of the height of the cutting insert. Depending on the design of transition flank surface 32, ribbed flank surface 30 may extend along the majority of the height of peripheral flank surface 18.

Ribbed flank surface 30 may be regarded as having "n" ridges 36 each having a crest which blends smoothly with a pair of planar, oppositely sloping, lateral abutment surfaces 38. At the junction of adjacent ridges, adjacent abutment surfaces 38 intersect at smoothed root regions 40. The number of ridges is equal to the number of available indexing positions of the insert. For a circular cutting edge, n is preferably at least 5, and typically 8 or more.

Figure 2A:
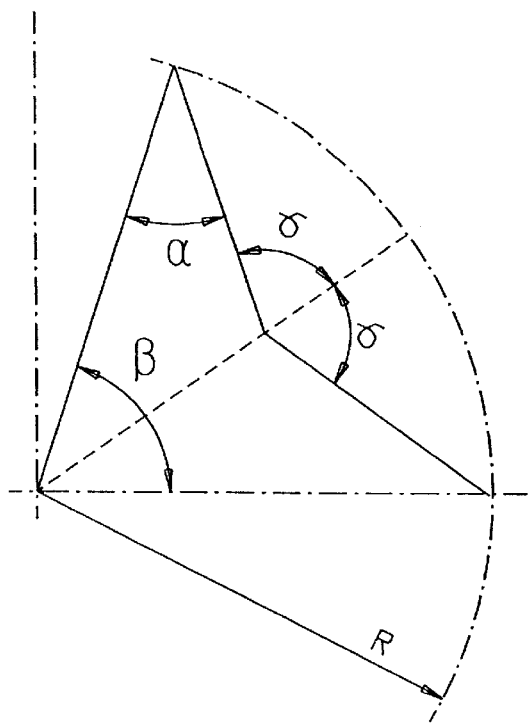
FIG. 2A is a schematic representation of a geometric generating segment according to the teachings of the present invention showing the definitions of certain angles to be referred to in the description.
Figure 2B:
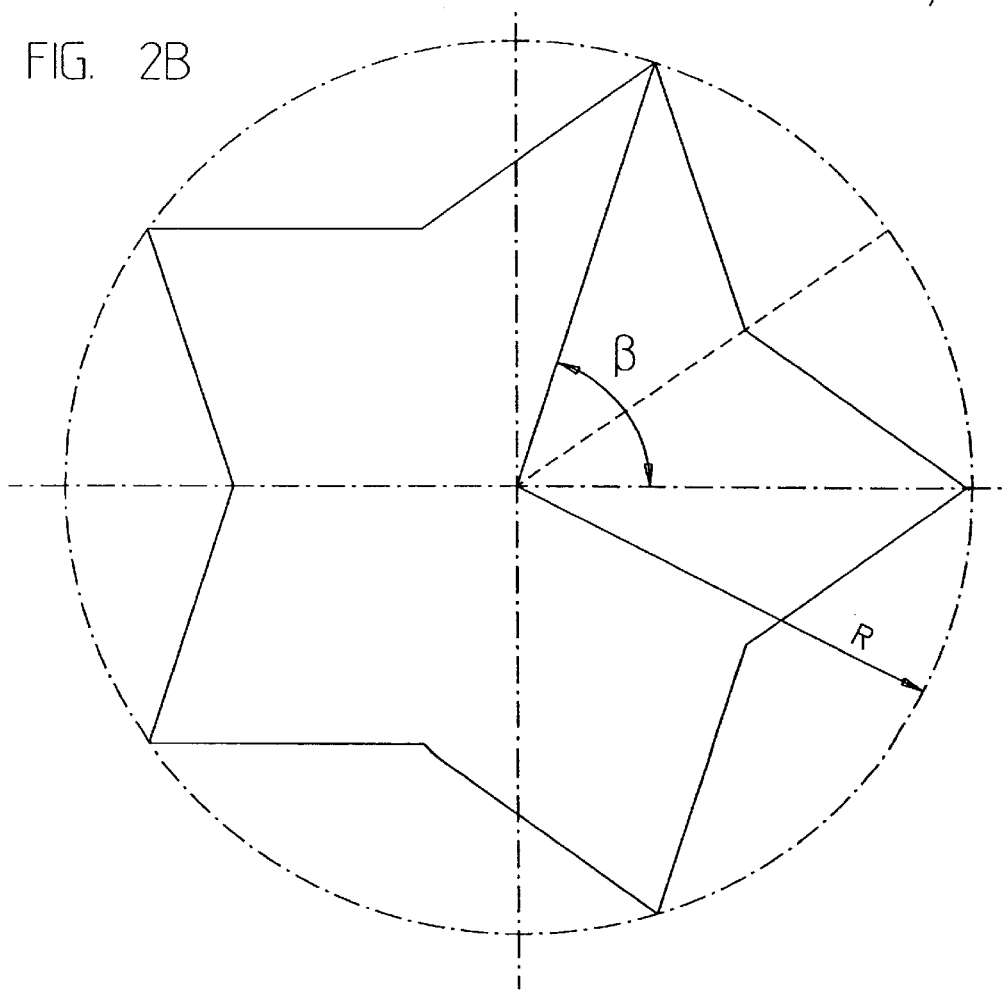
FIG. 2B is a schematic representation of the geometry of a cross-section through a cutting insert constructed and operative according to the teachings of the present invention, the geometry being produced by rotational copying of the generating segment of FIG. 2A.
Figure 3:
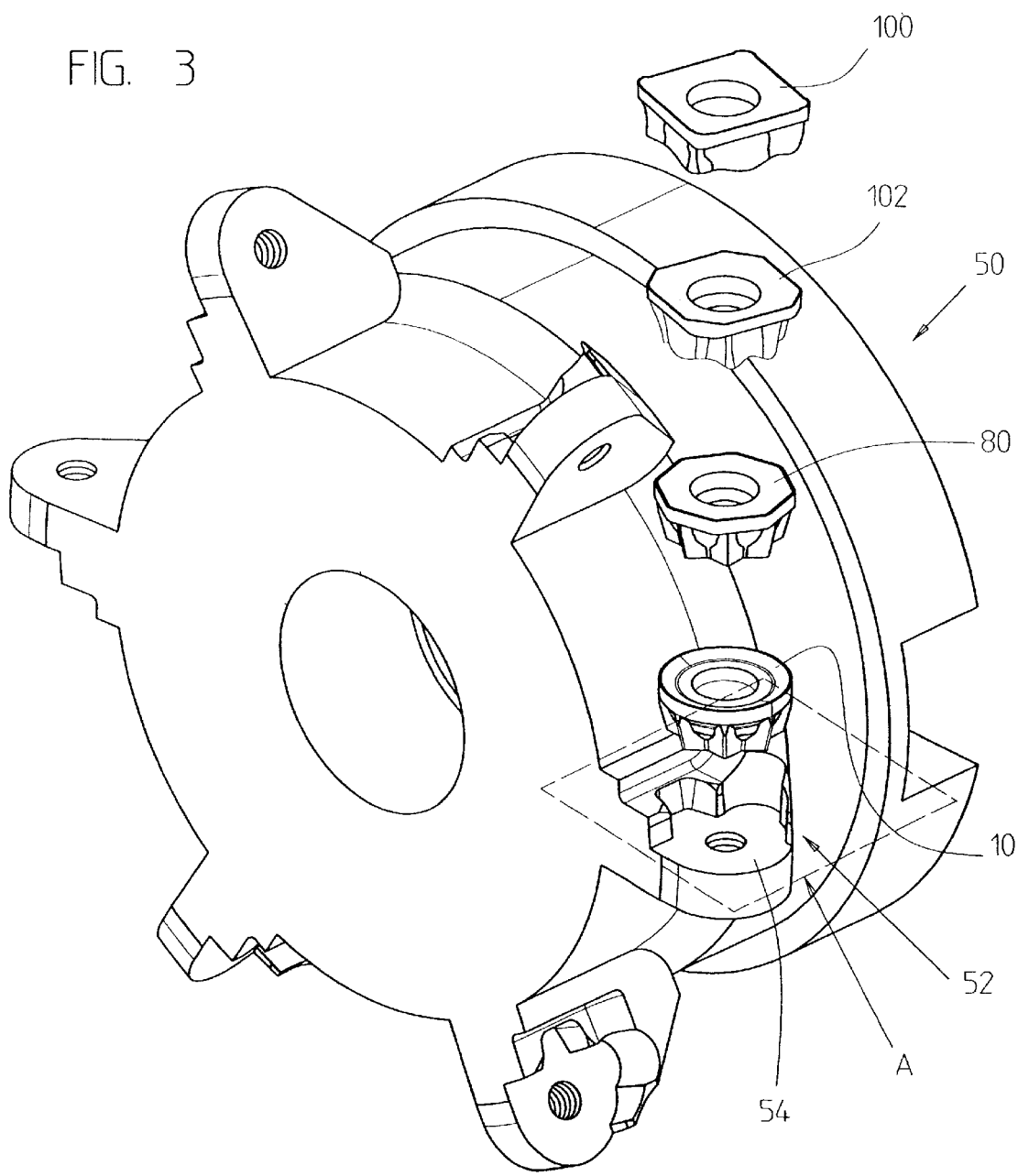
FIG. 3 is a partially dissembled perspective view of a machine tool cutter, constructed and operative according to the teachings of the present invention, including four of the cutting inserts of FIG. 1A mounted in pockets of a tool holder.

Turning briefly to FIGS. 2A and 2B, these illustrate how the cross-section of ribbed flank surface 30, shown here with n=5 may be considered an n-pointed star (FIG. 2B) defined by rotationally copying n−1 times a concave chevron-shaped "generating segment" (FIG. 2A) having symmetric legs on either side of a bisecting radius. The generating segment subtends a central pitch angle $\beta$ equal to 360°/n.

As will discussed further below, it is a feature of certain preferred implementations of cutting insert 10 that two spaced-apart abutment surfaces 38 are coplanar. In a simple example where n=8, this may be achieved by ensuring that the symmetrical legs of the generating segment form angles $\gamma$ relative to a bisecting radius equal to (90°−$\beta$/2°). The corresponding angle $\alpha$ is equal to (90°−$\beta$°). Thus, in this eight corner example illustrated. $\alpha$=45°, $\beta$=45°, and $\gamma$=67.5°. Where larger numbers of corners are employed, the coplanar surfaces may be two or more ridges apart.

It is a further feature of certain preferred implementations of cutting insert 10 that the two spaced-apart abutment surfaces 38 have perpendicular intersections with a cross-section taken through cutting insert 10 perpendicular to its axis. The surfaces themselves may vary from perpendicular due to tapering of ribbed flank surface 30. However, for convenience of reference, such surfaces are referred to as "perpendicular abutment surfaces". This requirement may also be defined by simple geometrical conditions and, by way of example, is provided by the angles of the eight cornered insert listed above. Furthermore, the existence of at least some mutually perpendicular abutment surfaces follows immediately in any case in which n is a multiple of 4.

In a preferred case, ribbed flank surface 30 is ideally frustro-pyramidal, meaning, among other things, that all the lateral abutment surfaces 38 form the same angle η relative to the axis of cutting insert 10, as indicated in FIG. 1B. As a direct consequence, an imaginary straight line of intersection between pairs of lateral surfaces 38 associated with each ridge 36. passing through aligned corners of such ideally star-shaped polygonal contour sections as defined above, forms a corresponding angle φ with a normal to the base which is a function of both α and η, given by: φ=arc tan [sin(α) tan (η)]. The angle φ is larger than the relief angle ψ relating to the uppermost relief flank surface portion 28. Given that the pressure angle (a is less than 90°, it follows that φ>η. Naturally, all the ideally star-shaped polygonal contour sections are similar to one another, viz, can be obtained from one another by a mere change of scale.

Figure 1C:
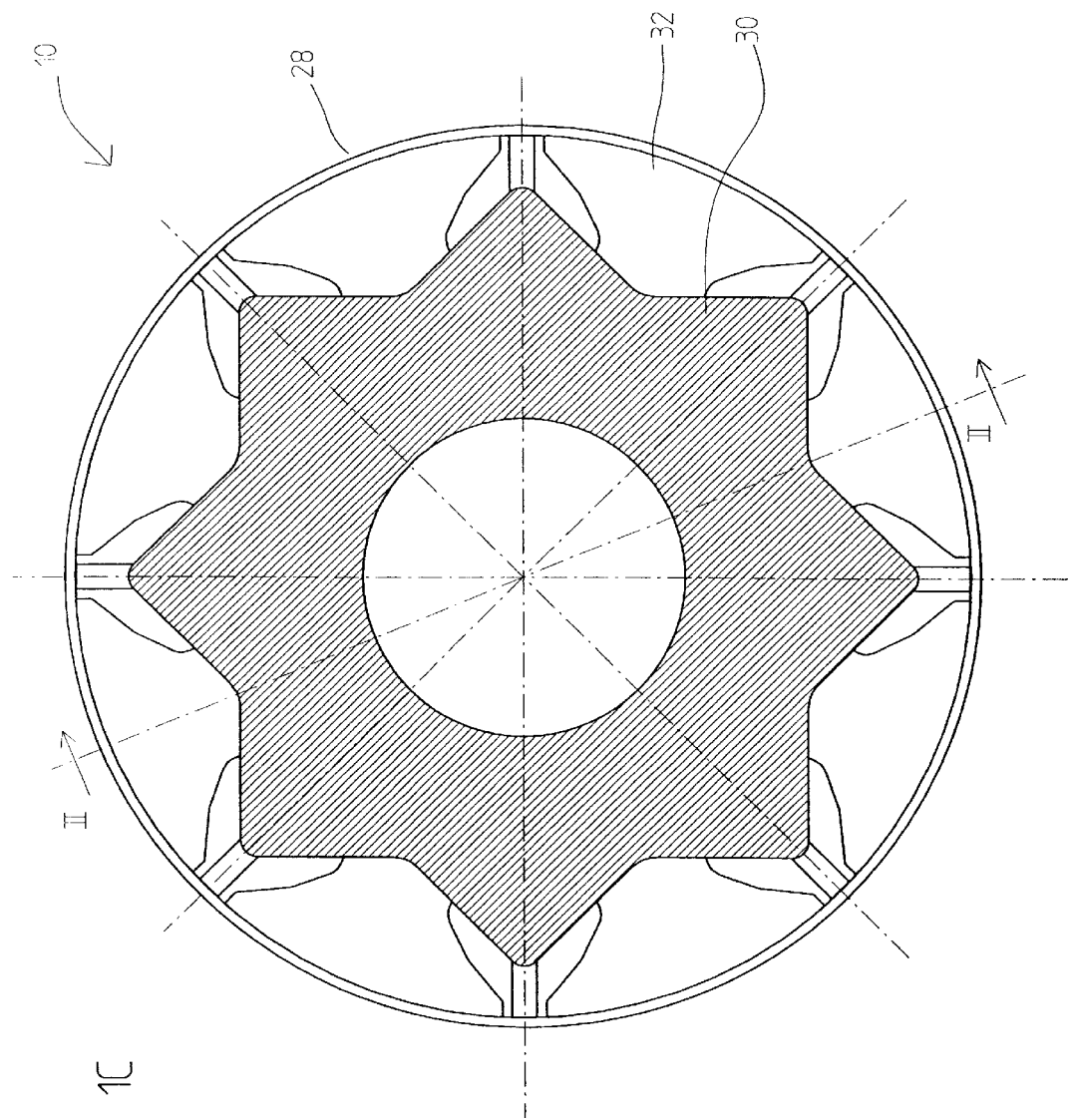
FIG. 1C is a cross-sectional upward view taken along the line I—I of FIG. 1B.
Figure 1E:
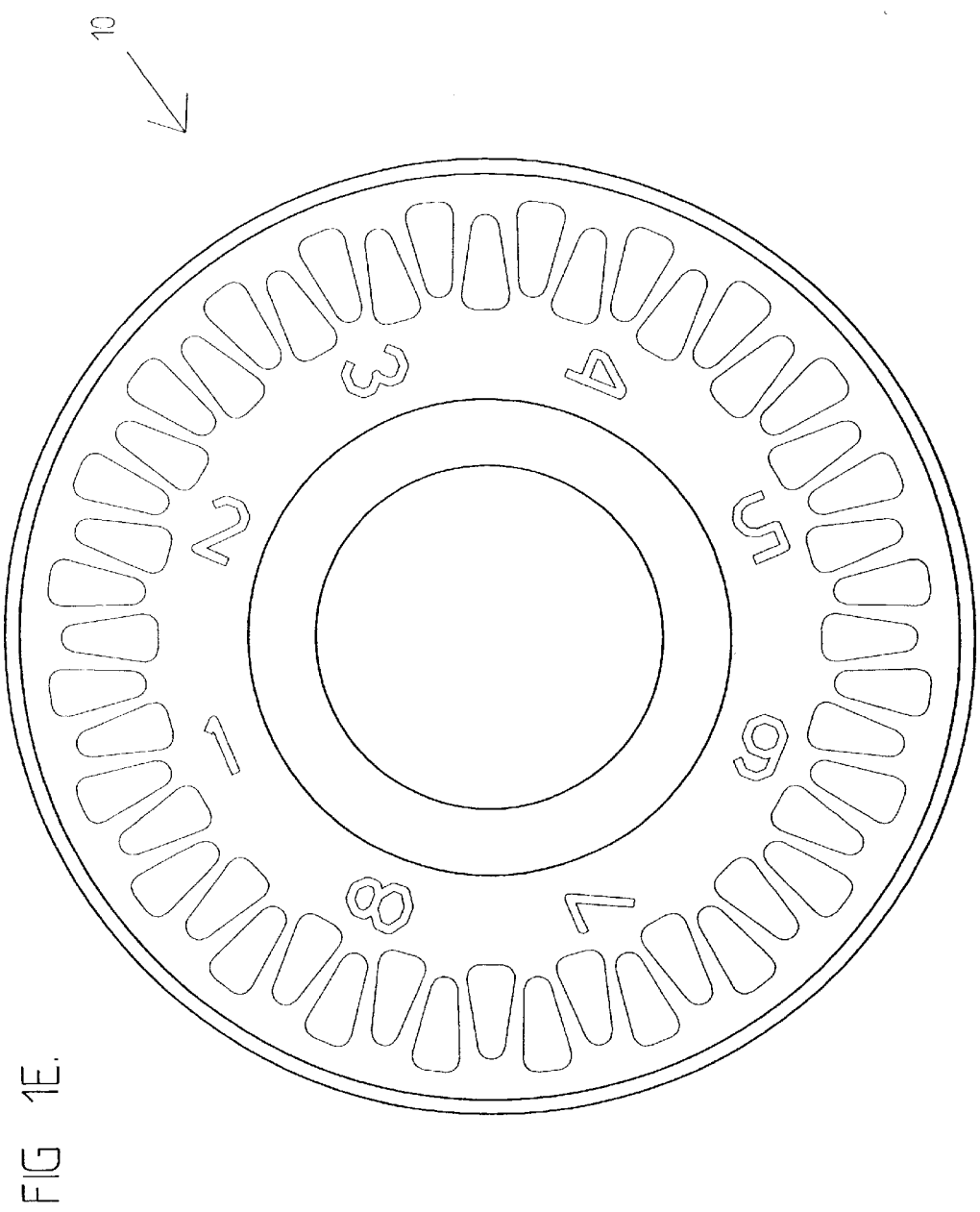
FIG. 1E is a top view of the cutting insert of FIG. 1A.

FIG. 1C shows ribbed flank surface 30 in section on plane I—I of FIG. 1B, i.e., at the junction between ribbed flank surface 30 and transition flank surface 32. It can be seen that the star-shaped polygonal contour of ribbed flank surface 30 is modified from the ideal shape in that the ridges 36 and root regions 40 have-been truncated and/or rounded out. In practice, all star-shaped polygonal contours on all horizontal planes of the lowermost body portion are typically identically modified, i.e., then have ridges 36 and root regions 40 which are truncated with the same width of filleted chamfers to produce ridges and root regions with constant widths, as seen in FIG. 1B. Since ridges 36 and root regions 40 have uniform widths along their respective length extents, they form the same angle φ with a normal to the base as the imaginary line of intersection between lateral abutment surfaces 38.

As the root regions 40 are transformed into the tapered surfaces 42 with the onset of the transition flank surface 32, the part of the star-shaped polygonal contours nearest to root region 40 is gradually lost. The geometry of abutment surfaces 38 near to ridges 36, on the other hand, is maintained until the junction between transition flank surface portion 32 and relief flank surface 28 where ridges 36 themselves merge with relief flank surface 28.

Transition flank surface portion 32, itself, results from the superposition or union of a prolongation of the ribbed portion of ribbed flank surface 30 with a tapered surface 42, best seen in FIG. 1D. As a result, transition flank surface portion 32 provides a gradual transition over which the depth of the channels 34 in peripheral flank surface 18 are gradually reduced towards relief flank surface 28. Preferably, transition flank surface portion 32 extends for at least about a third of the height of the cutting insert.

For powder metallurgy technological reasons, as well as for structural reasons, upper relief flank surface 28 and cutting edge 14 are preferably supported by tapered surfaces 42. The detailed shape of tapered surfaces 42 may vary considerably. Preferred examples include frustro-conical (i.e., rounded) or frustro-pyramidal (i.e., flat surfaced) segments.

Turning now to FIGS. 3–6, there is shown a machine tool cutter or tool holder, generally designated 50, constructed and operative according to the teachings of the present invention, employing a number of cutting inserts 10 mounted in insert receiving pockets 52.

Each pocket 52 is formed with a base support surface 54 for supporting the base, and at least two, and preferably three, lateral support surfaces located for abutting angularly spaced abutment surfaces 38 provided by cutting insert 10. In the example illustrated here, these include a first support surface 60, a second support surface 58, and a third abutment surface 56. The combination of these lateral support surfaces provides a lateral support/restraint system structurally capable of resisting considerable torque.

The receiving pocket may be an integral part of the tool holder or an adapter part connected in any suitable way to the tool holder. In the latter case, a single tool holder may be made to receive, through a suitable range of adapters, a corresponding range of indexable inserts. As will be illustrated below, each pocket is itself able to accommodate a full set of inserts.

Figure 5:
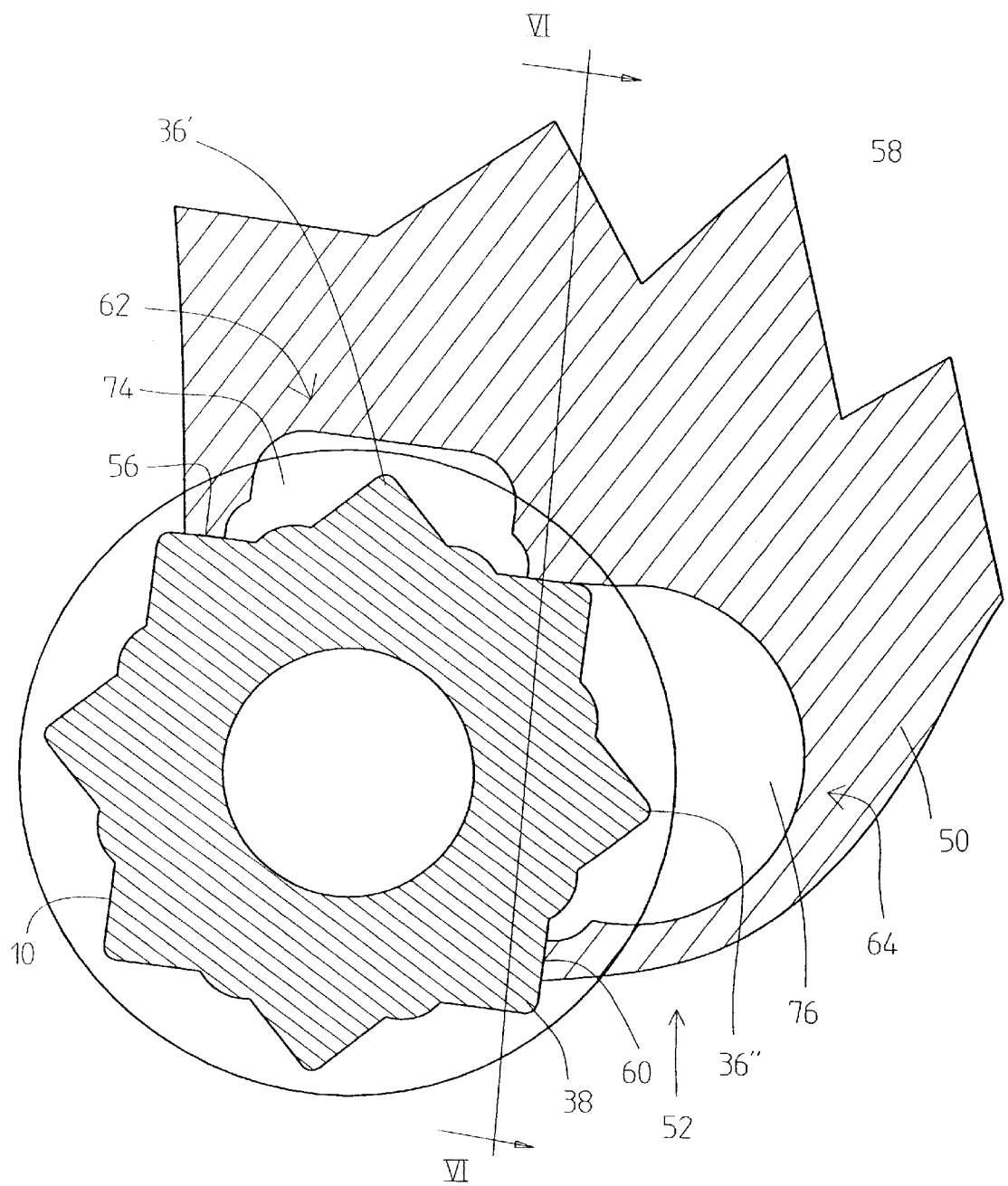
FIG. 5 is a horizontal cross-sectional view showing the abutment geometry of the cutting insert of FIG. 1A in the pocket of FIG. 4.
Figure 6:
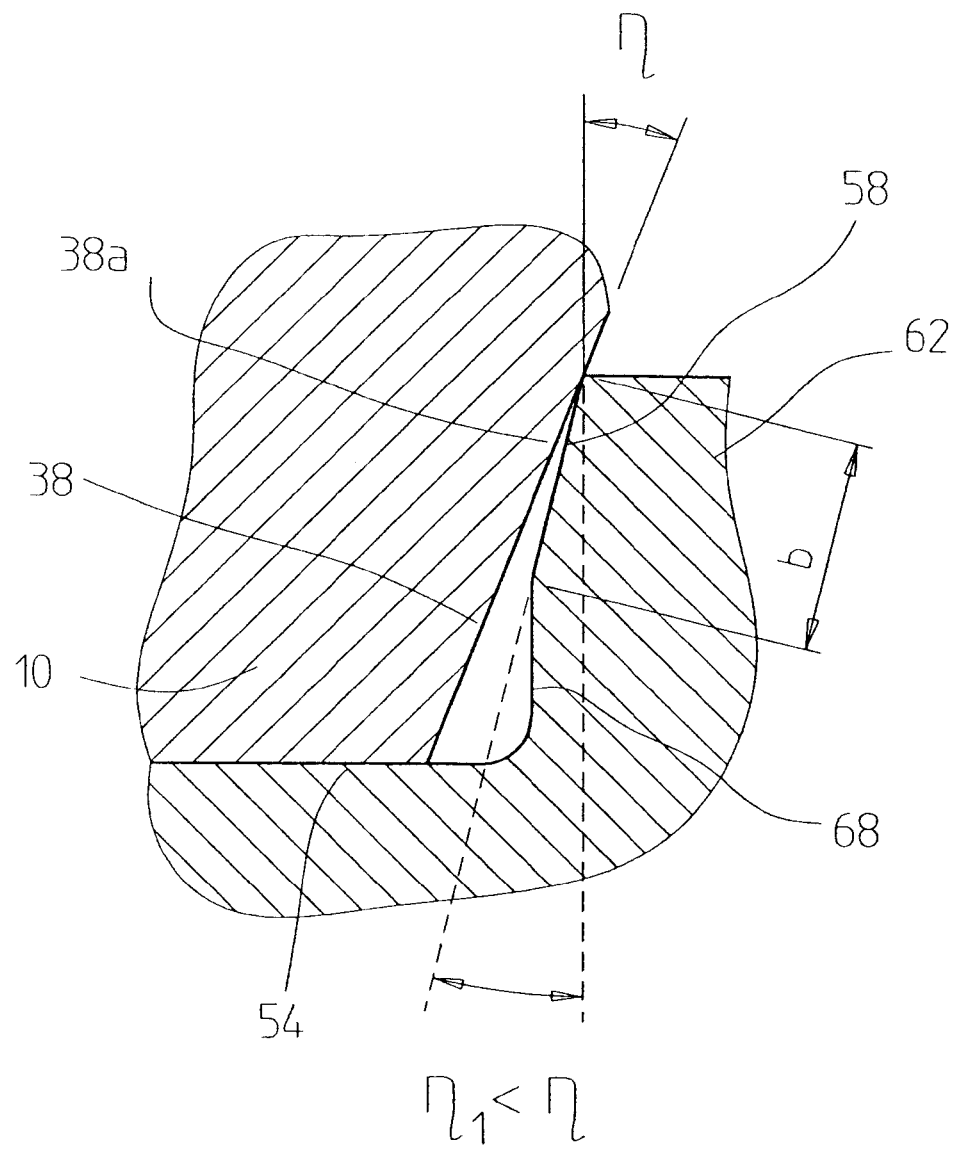
FIG. 6 is a partial vertical cross-sectional view taken along the line VI—VI of FIG. 5 showing a preferred geometry of contact between the cutting insert of FIG. 1A and one of the support surfaces of the pocket of FIG. 4.

Additional features of pocket 52 are shown in the schematic sectional views of FIGS. 5 and 6. Pocket 52 has two generally perpendicular lateral walls, 62 and 64, with lateral support surfaces 56 and 58 integrally formed with wall 62 and support surface 60 integrally formed with wall 64. Support surfaces 56, 58, and 60 preferably do not extend all the way to the base 54 of the insert receiving pocket 52. At their lowermost border, the support surfaces meet in recessed bottom portions which are slanted away from the insert. By way of an example, FIG. 6 which is a fragmentary cross-section of FIG. 5 on plane VI—VI shows support surface 58 of the lateral wall 62 and an associated recessed bottom portion 68 of the same wall.

It will be understood that the innermost support surface, i.e. support surface 58, of the lateral wall 62 may be omitted since the remaining support surfaces 56 and 60 fully define an effective lateral support/restraint system. However, in most cases, a three-point or more accurately, three-surface support geometry is preferred.

As also exemplified in FIG. 6, the support surfaces lie on planes which are slanted in such a way as to match the slant of the insert lateral abutment surfaces 38, i.e., they make an angle with a normal to the base of the platform of the receiving pocket that is substantially equal to the angle θ made by the insert lateral surfaces 38. It should be noted that the angles in FIG. 6 have been exaggerated for clarity of exposition. A fresh receiving pocket is manufactured With tolerances for the abutment surfaces slanting angles such that upon initial assembly of an insert in its pertaining receiving pocket contact is initialized at an upper region of the support surface. Upon plastic deformation of this surface, during mostly the initial clamping, contact spreads from the upper region and gradually encompasses the entire area of the support surface. In this way an abutment surface 38a corresponding to the "foot-print" of the abutment surface is established, in the form of a band of depth "b" corresponding to the depth of the abutment surface, on the juxtaposed pertaining lateral surface 38 towards the top of the ribbed flank surface 30 and extending by about b/2 into the transition surface portion 32.

Figure 4:
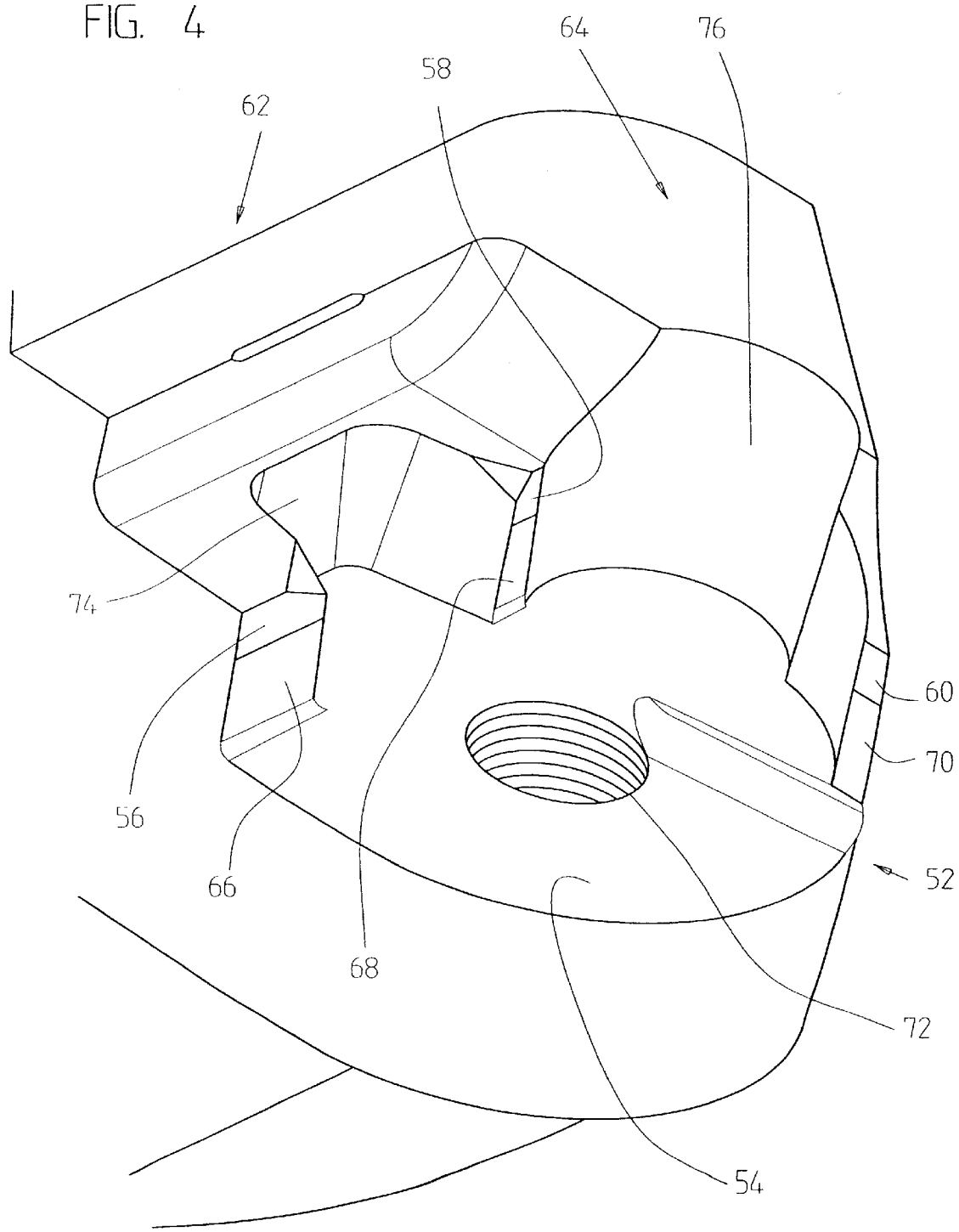
FIG. 4 is an enlarged perspective view of one of the pockets of the tool holder of FIG. 3.

Turning now to a number of additional features of tool holder 50, FIG. 4 shows pocket 52 in which base 54 is substantially planar with a central threaded bore 72. Threaded bore 72 is very slightly off-set from the through bore 26 of the insert when the latter is seated in the receiving pocket firmly clamped with its clamping screw. This is to ensure that tile abutment surfaces of the insert are biased against the corresponding support surfaces of the receiving pocket.

Lateral wall 62 includes the previously mentioned support surfaces 56 and 58, recessed bottom portions 66 and 68, and a relief hollow 74. Lateral wall 64 includes support surface 60, a recessed bottom portion 70 and a relief hollow 76.

Typically, support surfaces 56, 58 and 60 are substantially flat, and can be taken to define planes of contact. It should be noted, however, that other forms of abutment surfaces such as, for example, a convex surface, may also be used. All the support surfaces are typically roughly equidistant from the central axis of the pocket.

Corresponding to the geometry of abutment surfaces 38 described above. support surface 60 is typically perpendicular to surfaces 56 and 58 which are, themselves, typically coplanar. Here too, the definition of "perpendicular" in this context is that the surfaces are at 90° to each other as viewed in a cross-section perpendicular to the axis of the pocket (itself corresponding to the axis of the insert when mounted in the pocket). Given that support surfaces 58 and 60 are designed to support abutment surfaces 38 which are related by rotation by 90°, surface 58 is also related to surface 60 through rotation by 90°.

Lateral relief hollows 74 and 76 must be configured to accommodate the ridges 36' and 36" of the insert (see FIG. 5) not currently employed for locating the insert. This condition can be expressed in terms of the geometrical properties of pocket 52, itself. Specifically, the opening of hollow 76 is formed such that a geometrical mapping of lateral support surface 60 by rotation through 45° about the axis of the pocket towards support surface 58 lies within hollow 76. Similarly, the opening of hollow 74 is formed such that a geometrical mapping of lateral support surface 58 by rotation through 45° about the axis of the pocket towards support surface 56 lies within hollow 74. In this context, it should be understood that the "support surface" referred to is the part of the surface configured so as to support the corresponding lateral abutment surfaces 38 of the insert.

Referring to FIG. 1A, cutting insert 10 has been illustrated with eight indexable stations, as identified on the annular portion 22 of the upper face 12 by the corresponding roman numerals and as manifested by tile use of eight rotational symmetric ridges. It should be appreciated, however, that the invention allows a considerably larger number of indexing stations.

Turning now to FIGS. 7A–7E, a second form of cutting insert, generally designated 80, constructed and operative according to the teachings of the present invention, is shown. Generally speaking, cutting insert 80 is similar to cutting insert 10 except that cutting insert 80 features a polygonal cutting edge 82 with eight indexable cutting edges 84. The cutting edges are coordinated With an 8-ridged flank surface 86, similar to ribbed flank, surface 30 described above.

Figure 7A:
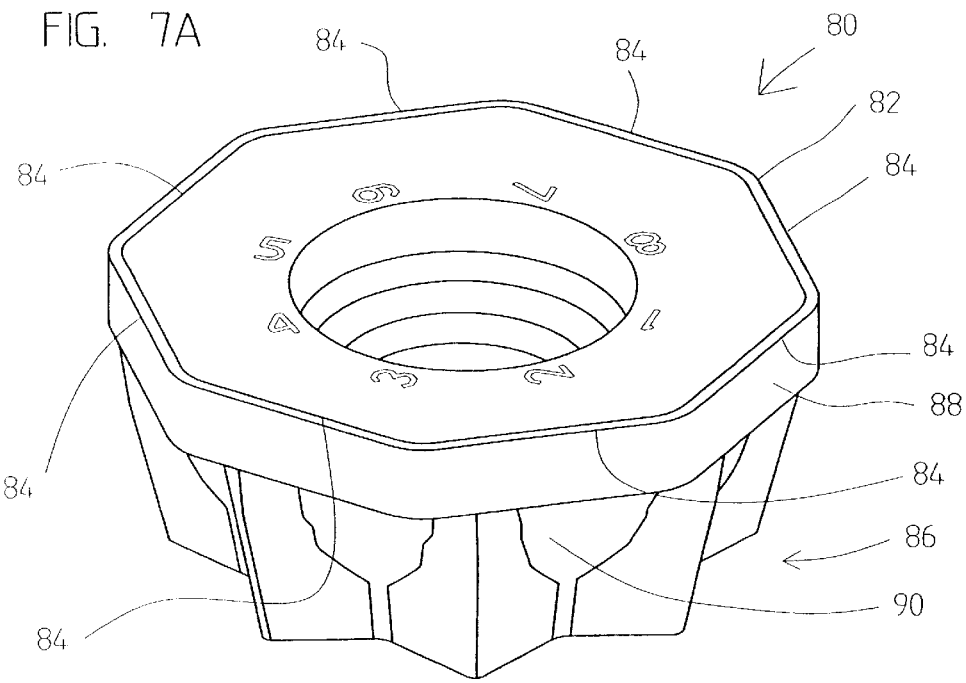
FIGS. 7A–7E are views similar to those of FIGS. 1A–1E, respectively, illustrating a second preferred cutting insert, constructed and operative according to the teachings of the present invention, having a polygonal cutting edge.
Figure 7B:
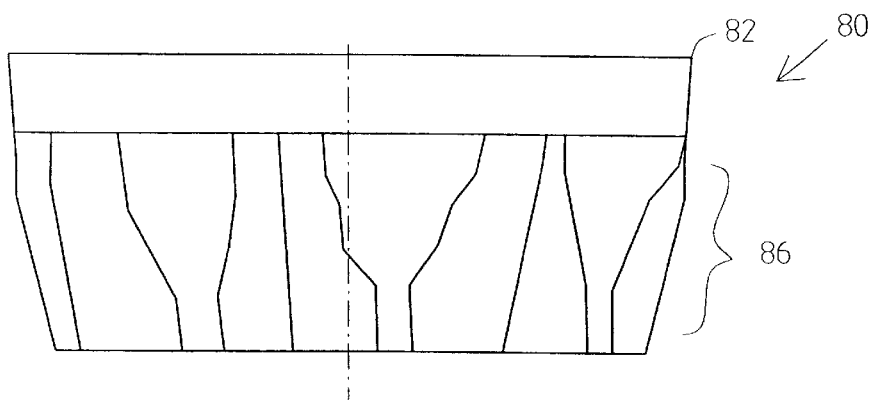
Figure 7C:
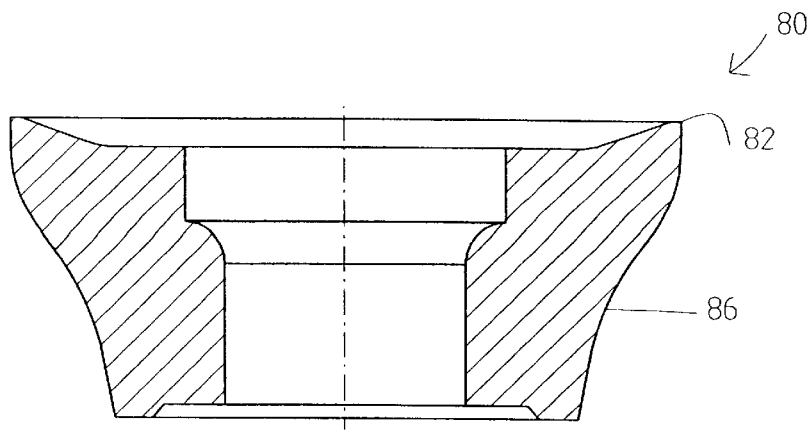
Figure 7D:
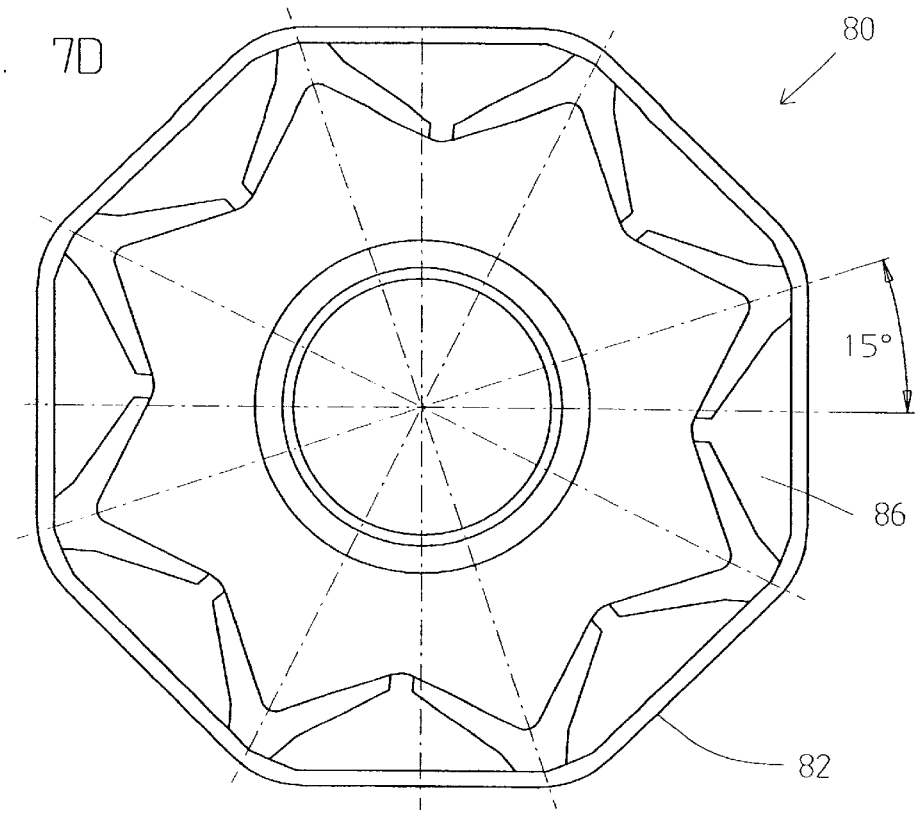
Figure 7E:
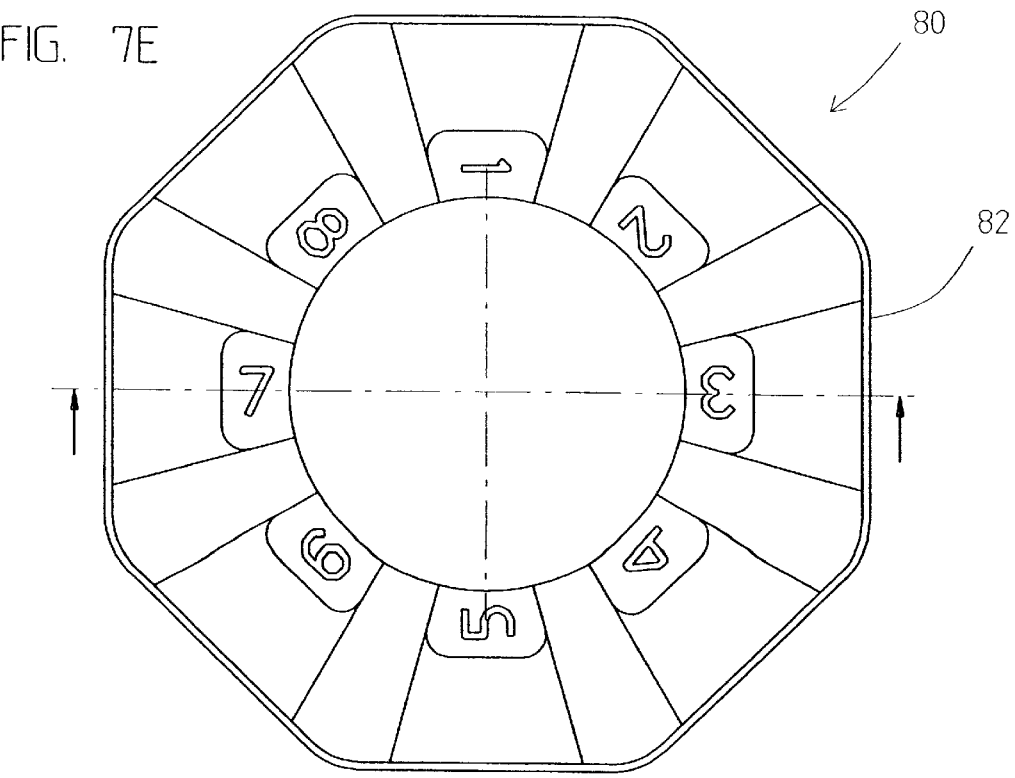

Clearly, as seen in FIG. 7A, the relief flank surface 88 in this case has a polygonal shape matching the cutting edge 82 and the tapered surface 90 of the transition surface portion is preferably frustro-pyramidal. Optionally, depending on the preferred geometry of the pocket support surfaces, the ridges of the flank surface may be rotated relative to the cutting edge geometry. In the example illustrated, a rotation of 15° has been introduced as can be seen most clearly in FIG. 7D.

Turning now to further features of the present invention, it has been found that the abutment geometry described thus far can be used to advantage as the basis for a modular cutting tool assembly. It will already be apparent that cutting insert 80 can be used interchangeably with cutting insert 10 within pocket 52. thereby serving as two members of a modular set of interchangeable cutting inserts. In addition to these, a preferred implementation of the present invention also provides a cutting tool assembly with interchangeable inserts having differing numbers of indexing positions and differing entering angles for different machining applications. These and other features will now be illustrated with reference to FIGS. 9–13 through description of two additional inserts 100 and 102 which can also be used within the same pocket 52 (see FIG. 3).

Before addressing the remaining Figures directly, it bill be helpful to clarify certain terminology to be used in the remainder of this description, as well as in the claims. Up until this point, reference has been made to individual cutting inserts with a given order of rotational symmetry corresponding to a given number of indexing positions. For ease of exposition, this has been referred to as "n?-fold symmetry". At this point, however, it will be necessary to distinguish between interchangeable cutting inserts having differing orders of rotational symmetry, corresponding to differing numbers of indexing positions.

The sets, or "families", of interchangeable cutting inserts to be described must all have a number of indexing positions which is a multiple of some lowest-symmetry insert. Thus, one set could include 3-, 6-, 9- and even 11-fold symmetry, while another could include 5- and 10-fold symmetry. For generality of reference, two cutting inserts from a set will be described as having n-fold and m×n-fold symmetry, respectively, where n is an integer greater than or equal to 3 and m is an integer greater than or equal to 2.

By way of example, cutting inserts 100 and 102 described here both have 4-fold rotational symmetry whereas cutting inserts 10 and 80 both have 8-fold rotational symmetry. Thus the two orders of symmetry exemplified correspond to the conditions n=4 and m=2.

Turning now to FIGS. 8A–8F, there is shown a first cutting insert, generally designated 100, having n-fold (in this case 4-fold) rotational symmetry. It is a particular feature of preferred implementations of cutting insert 100 that it is indexable exclusively at n indexing stations within an insert receiving pocket which is configured to receive alternately cutting inserts having both n-fold rotational symmetry and m×n-fold rotational symmetry, in this case, 4-fold and 8-fold rotational symmetry.

Generally speaking, cutting insert 100 has a unitary structure providing an upper surface 104 bounded by a cutting edge 106, a base 108, and a peripheral flank surface 110. The peripheral flank surface is shaped such that an outline of a first cross-section taken through the lower part of the cutting insert perpendicular to its central axis 117 exhibits a recessed form which includes n corner portions 112 angularly spaced around the central axis so as to provide n-fold rotationally symmetric lateral abutment features, and support protrusions 114 protruding outwards from the peripheral flank surface between the corner portions. Support protrusions 114 are preferably shaped such that, under any geometrical mapping of an outline of corner portions 112 by rotation through an angle of less than 360°/n about the central axis, the support protrusions extend beyond the outline.

Figure 8A:
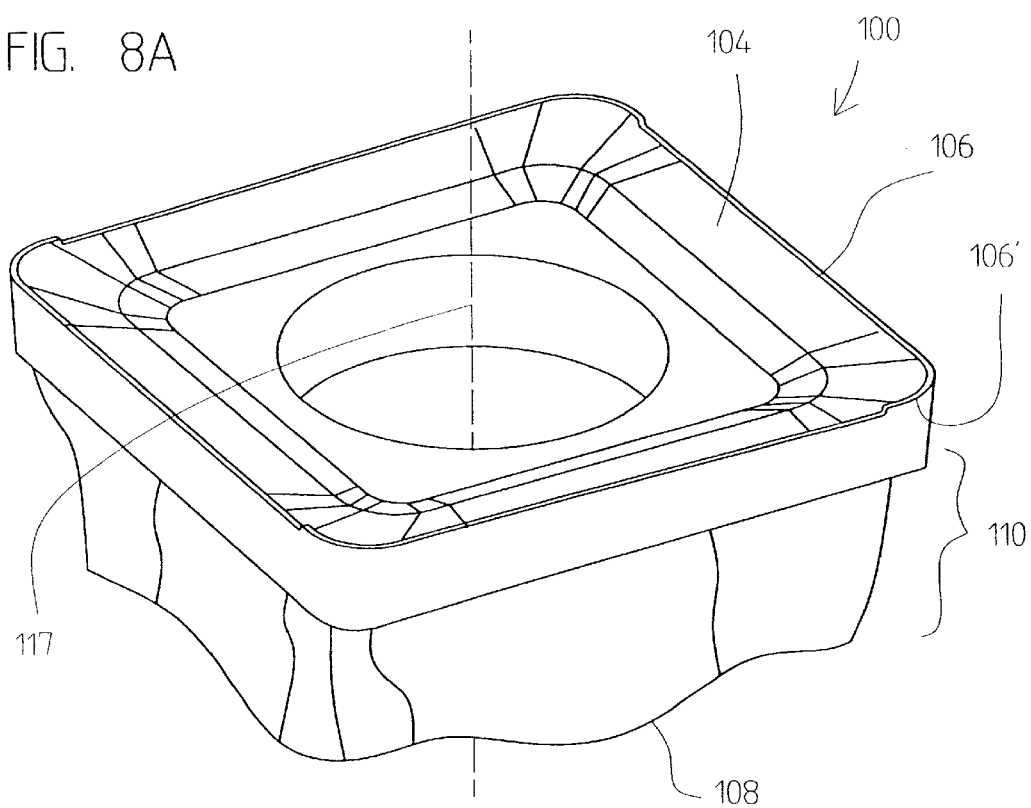
FIG. 8A is a perspective view of a third preferred cutting insert, constructed and operative according to the teachings of the present invention, mountable within the pocket of FIG. 4 in a reduced number of indexing positions.
Figure 8B:
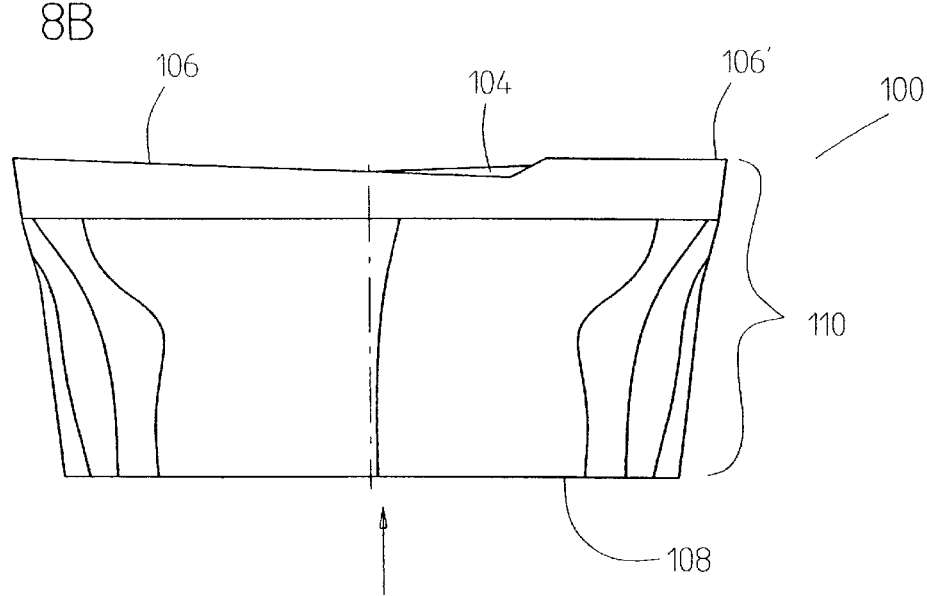
FIG. 8B is a side view of the cutting insert of FIG. 8A.
Figure 8C:
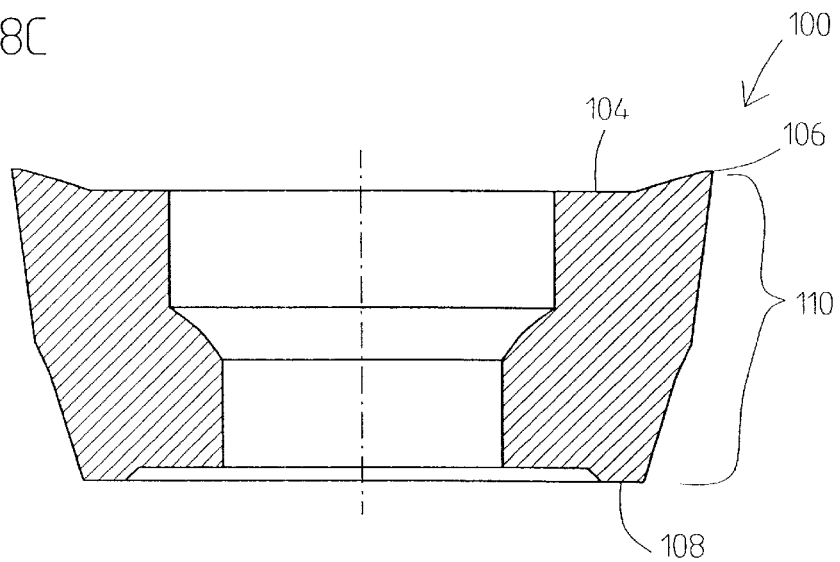
FIG. 8C is a side cross-sectional view of the cutting insert of FIG. 8A.
Figure 8D:
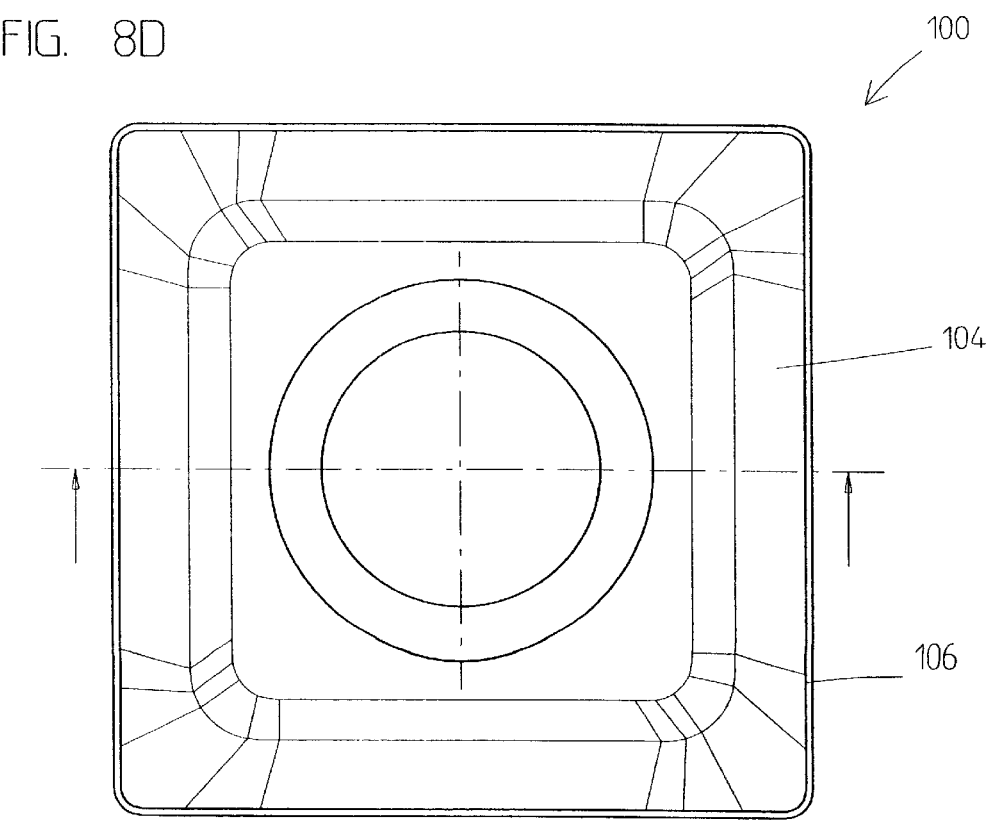
FIG. 8D is a top view of the cutting insert of FIG. 8A.
Figure 8E:
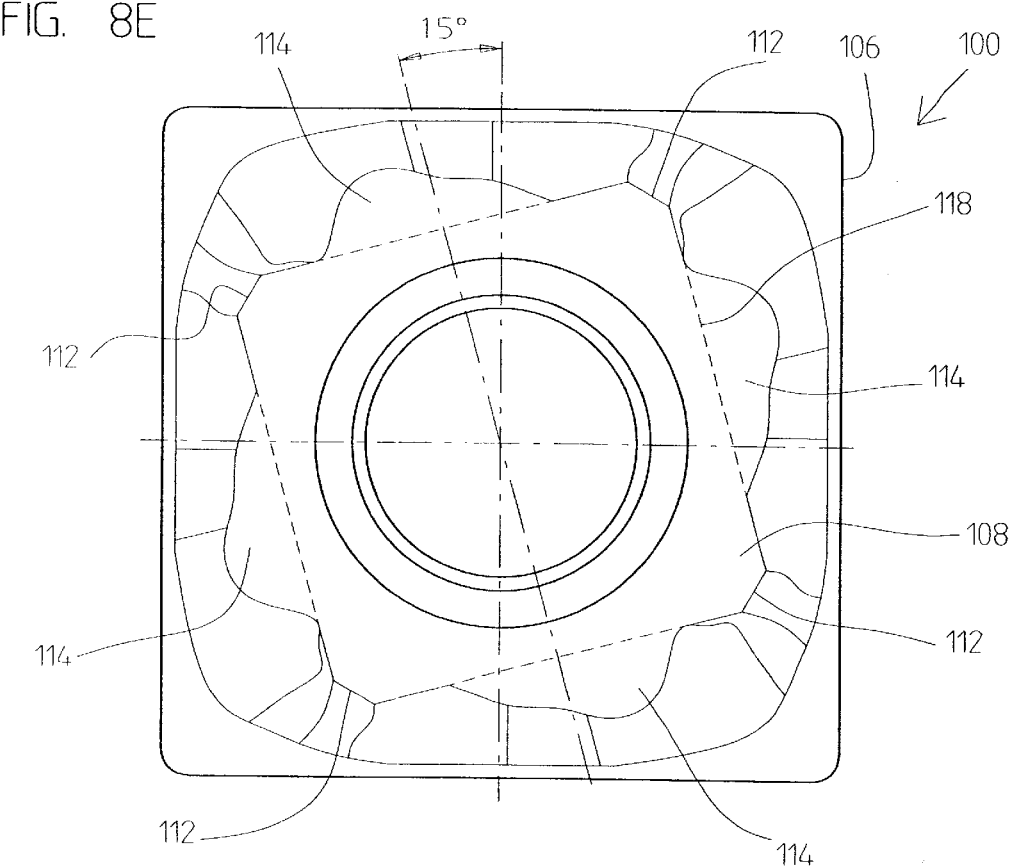
FIG. 8E is a bottom view of the cutting insert of FIG. 8A with added construction lines to emphasize the geometry of lateral abutment surfaces of the insert.
Figure 8F:
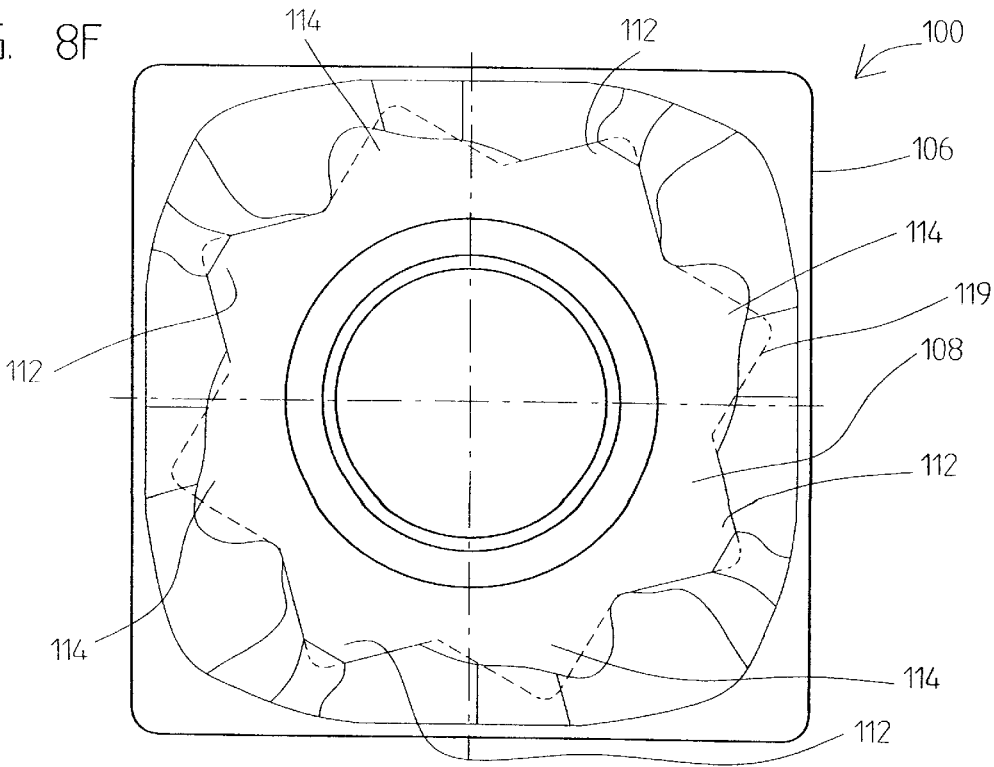
FIG. 8F is a view similar to FIG. 8E with added construction lines to compare the geometry of lateral support protrusions of the insert with the high rotational symmetry features of the inserts of FIGS. 1 and 7.

These geometrical relationships will be better understood with reference particularly to FIGS. 8E and 8F. Both of these Figures show similar bottom views of cutting insert 100, but have different construction lines added for convenience of exposition. Parenthetically, it should be noted that, in the examples shown here, the required geometry appears in the lower portion of the insert and continues to the base 108. As a result, the bottom view can be used to illustrate the features of the required geometry. In the general case, these features need not necessarily extend to the base. However, equivalent features will be present in a cross-sectional view taken at some point in the lower part of the insert. The words "lower part" in this context are taken to refer to the lower 70%. and typically, the lower half, of the insert.

FIG. 8E shows base 108 with the addition of four straight construction lines 118 joining between corner portions 112. Here, it can be seen that corner portions 112, equivalent to the flank ridges 36 described above, correspond substantially to corner regions of a regular polygon of n sides, in this case, a square. These corner portions provide abutment surfaces in a configuration equivalent to the abutment surfaces of inserts 10 and 80 described above, but with only 4-fold symmetry. Here again, the geometry of the abutment surfaces may be rotated relative to the cutting edge geometry, for example 15° anticlockwise as illustrated here, to achieve the desired entering angle (in this case, K=90° as seen in FIG. 9) of the cutting edge for a given pocket structure. FIG. 10 shows the alignment of these abutment surfaces with the support surfaces of pocket 52 when the insert is inserted correctly.

FIG. 8F shows base 108 with the superposition of high symmetry lines 119 corresponding to the higher symmetry 8-ridged structure of the lower part of cutting inserts 10 and 80. Corner portions 112 correspond substantially to the ridge shapes, indicating that they are configured to provide equivalent abutment surfaces. Support protrusions 114, on the other hand, are configured to differ significantly from the ridge shape thereby inhibiting incorrect indexing of the insert at intermediate positions. In a basic implementation, protrusions 114 can simply be omitted completely to provide a square base. Incorrect indexing is then quickly identified by a "loose" fit and complete lack of precision alignment. Preferably, however, support protrusions 114 are configured to provide additional support as near as possible to the cutting edge. Furthermore. in preferred implementations, protrusions 114 are configured to mechanically obstruct incorrect indexing of the insert within the pocket.

Figure 12:
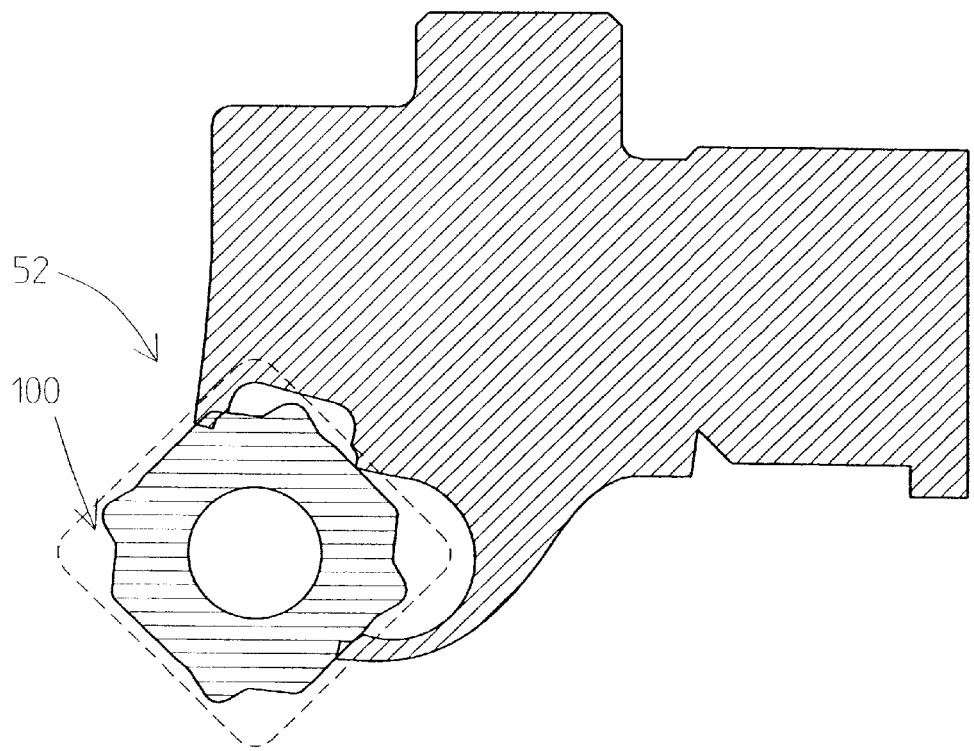
FIGS. 12 and 13 are views similar to FIGS. 10 and 11, respectively, showing the effect of attempts to position the inserts of FIGS. 8A and 9A incorrectly within the pocket of FIG. 4.

The criteria for the aforementioned mechanical obstruction are that protrusions 114 do not "fit" within the support surfaces of pocket 52. In a more precise formulation, support protrusions 114 are preferably shaped such that, when an outline of corner portions 112, corresponding to the ridges illustrated. is rotated through any angle less than the step between indexing positions, 90° in the case of 4-fold symmetry, some part of support protrusions 114 extends beyond the outline. This geometrical property ensures that, if the insert is placed at an incorrect angle in the pocket, it will not sit properly, thereby making the mistake self evident. In this sense, the insert design can be considered "fool proof". FIG. 12 shows the effect of an attempt to mount cutting insert 100 incorrectly within pocket 52.

Typically, although not necessarily, the geometry of cutting edge 106 as defined by the outline of a cross-section taken through cutting insert 100 perpendicular to its central axis and proximal to upper surface 104 exhibits a non-recessed form. In this example, the cutting geometry is substantially square. The form of the cutting edge shown here is, in itself, conventional, each indexing station presenting a primary cutting edge at an entering angle K of substantially 90° and a secondary wiper edge 106' (see FIG. 10). The "entering angle" as used herein in the description and claims is defined as the angle K formed between the primary cutting edge of the insert when mounted within a tool and the feed direction 116 of the tool.

Figure 9A:
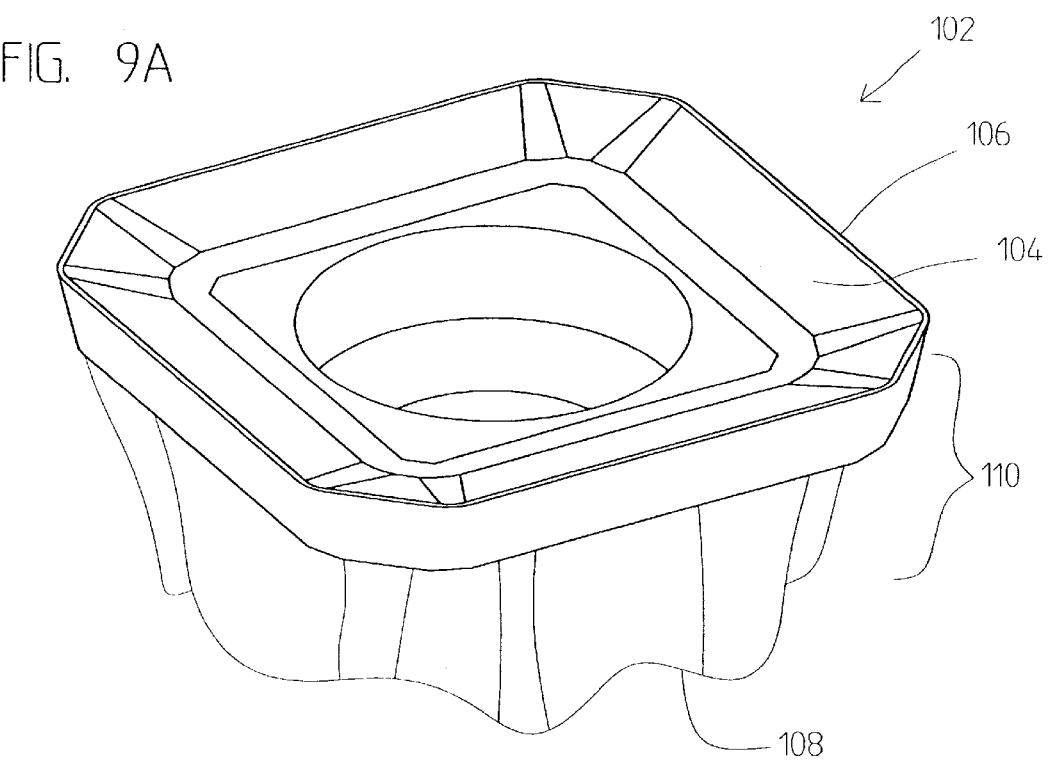
FIG. 9A is a perspective view of a fourth preferred cutting insert, constructed and operative according to the teachings of the present invention, mountable within the pocket of FIG. 4 in a reduced number of indexing positions.
Figure 9B:
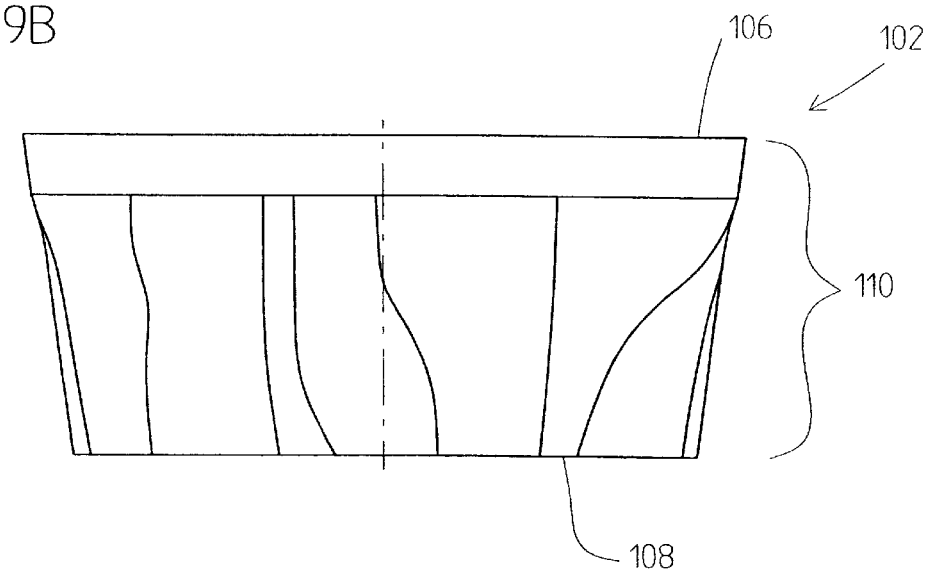
FIG. 9B is a side view of the cutting insert of FIG. 9A.
Figure 9C:
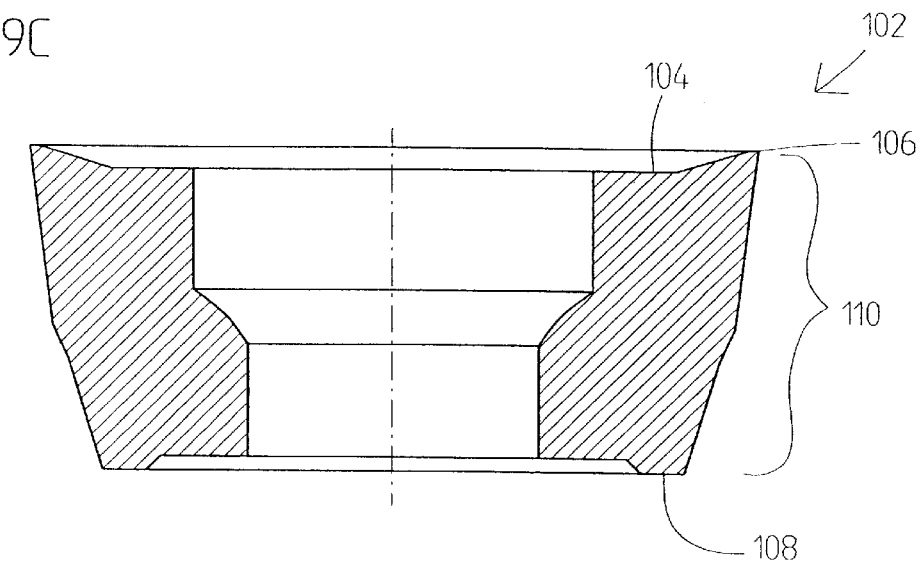
FIG. 9C is a side cross-sectional view of the cutting insert of FIG. 9A.
Figure 9D:
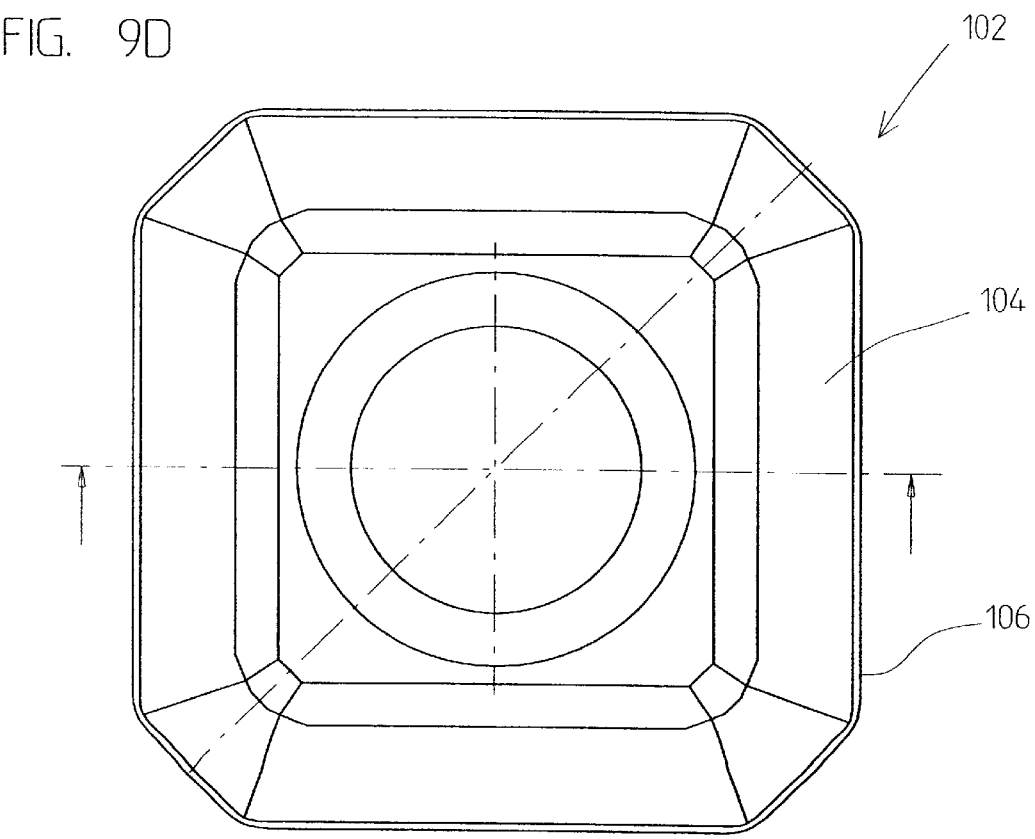
FIG. 9D is a top view of the cutting insert of FIG. 9A.
Figure 9E:
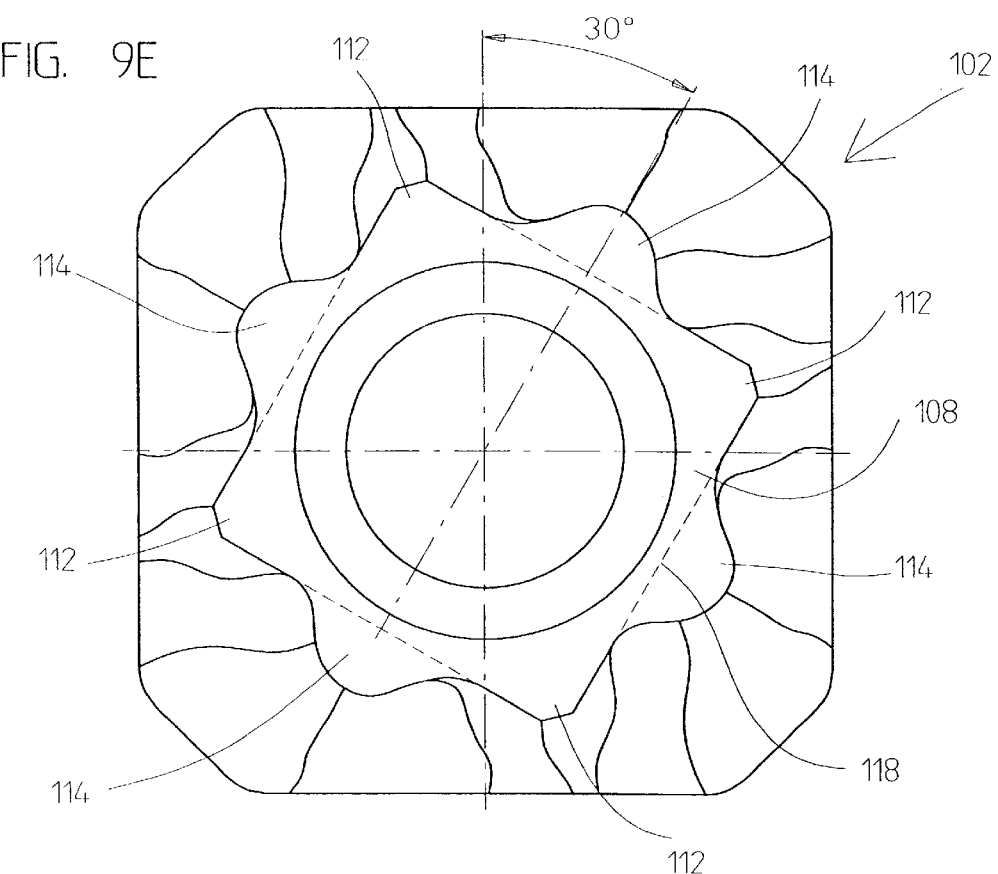
FIG. 9E is a bottom view of the cutting insert of FIG. 9A with added construction lines to emphasize the geometry of lateral abutment surfaces of the insert.
Figure 9F:
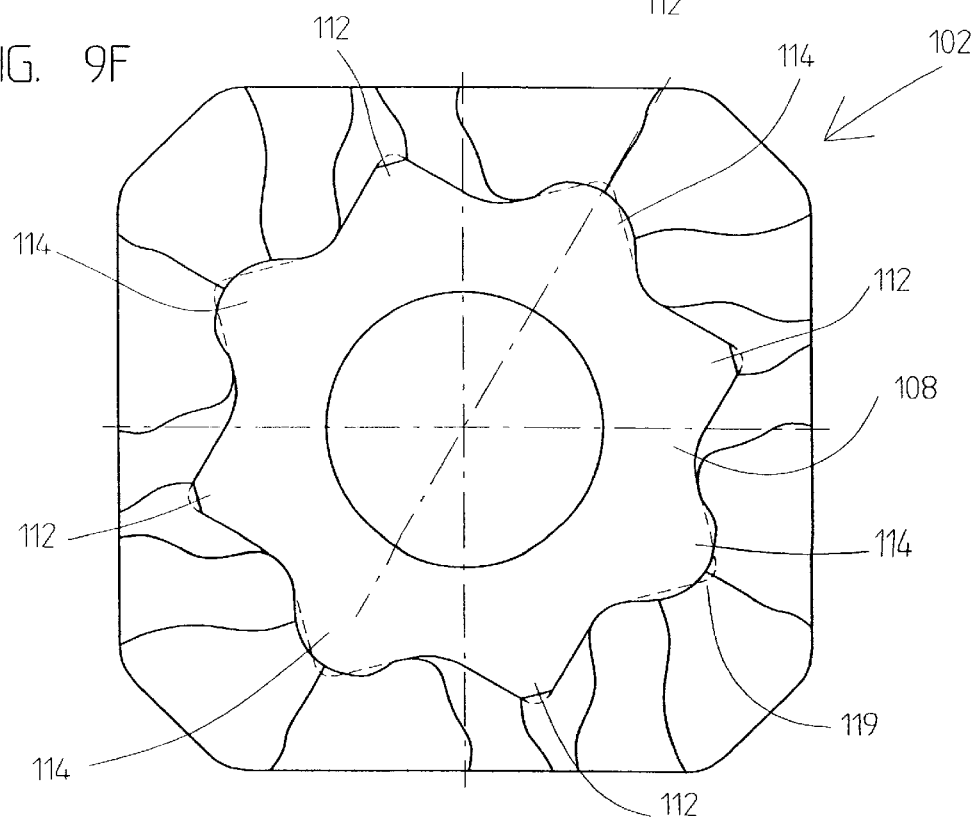
FIG. 9F is a view similar to FIG. 9E with added construction lines to compare the geometry of lateral support protrusions of the insert with the high rotational symmetry features of the inserts of FIGS. 1 and 7.
Figure 10:
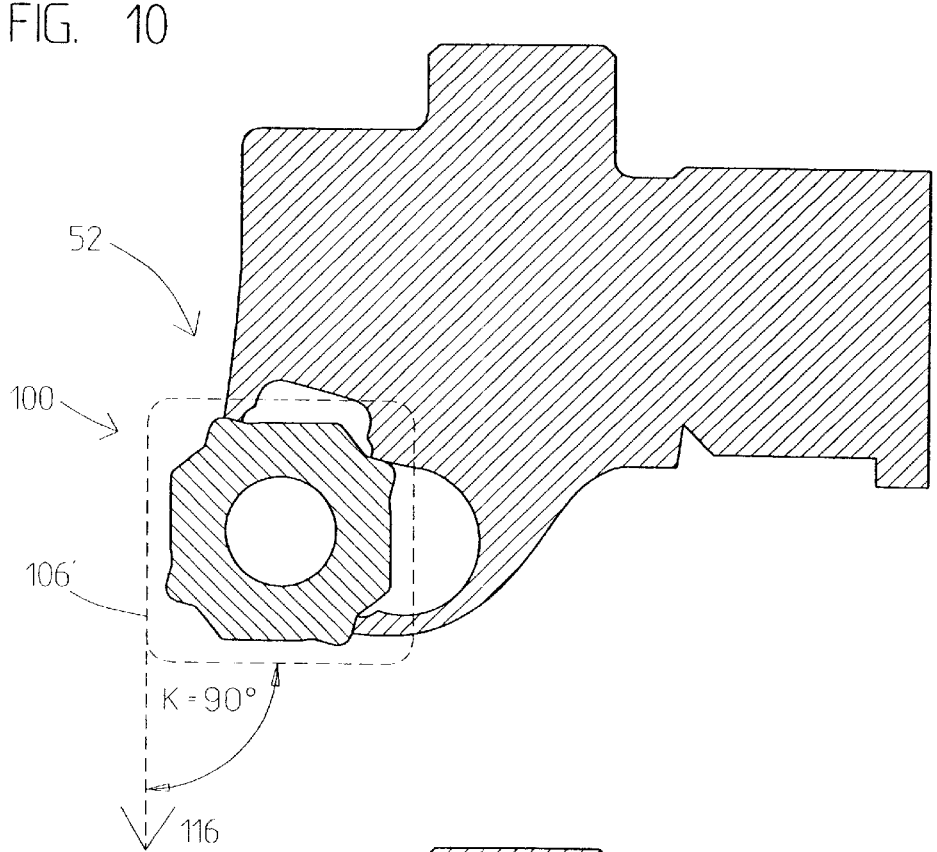
FIGS. 10 and 11 are views similar to FIG. 5 showing the abutment geometry and entering angle for the inserts of FIGS. 8A and 9A. respectively, when correctly mounted in the pocket of FIG. 4.
Figure 11:
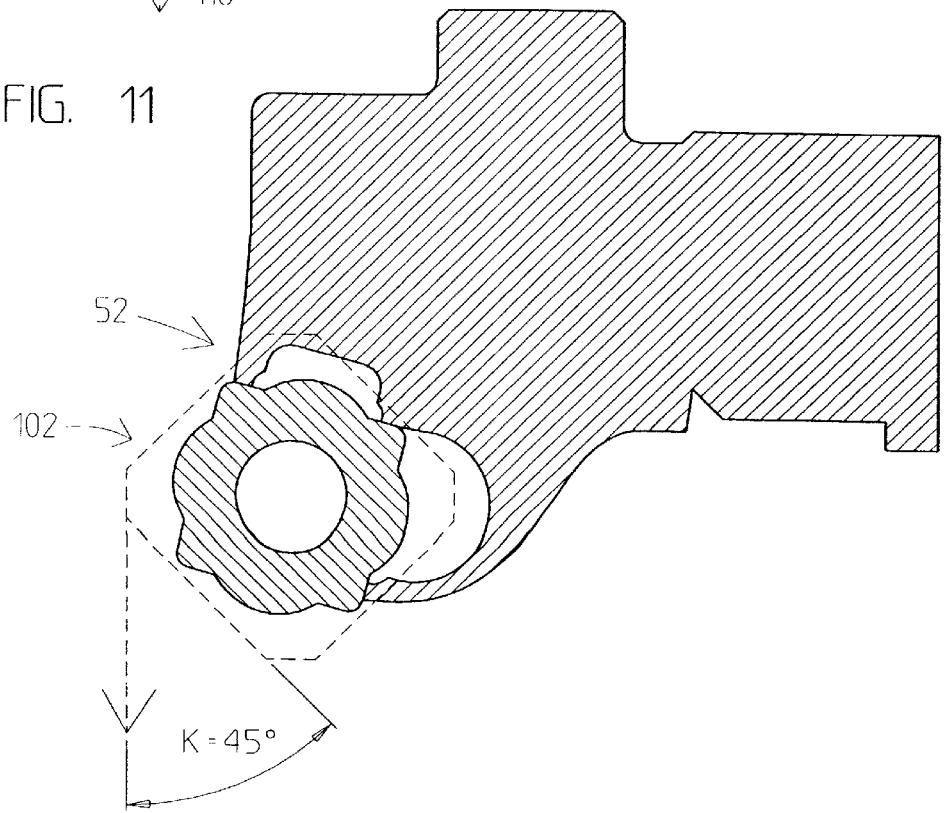
Figure 13:
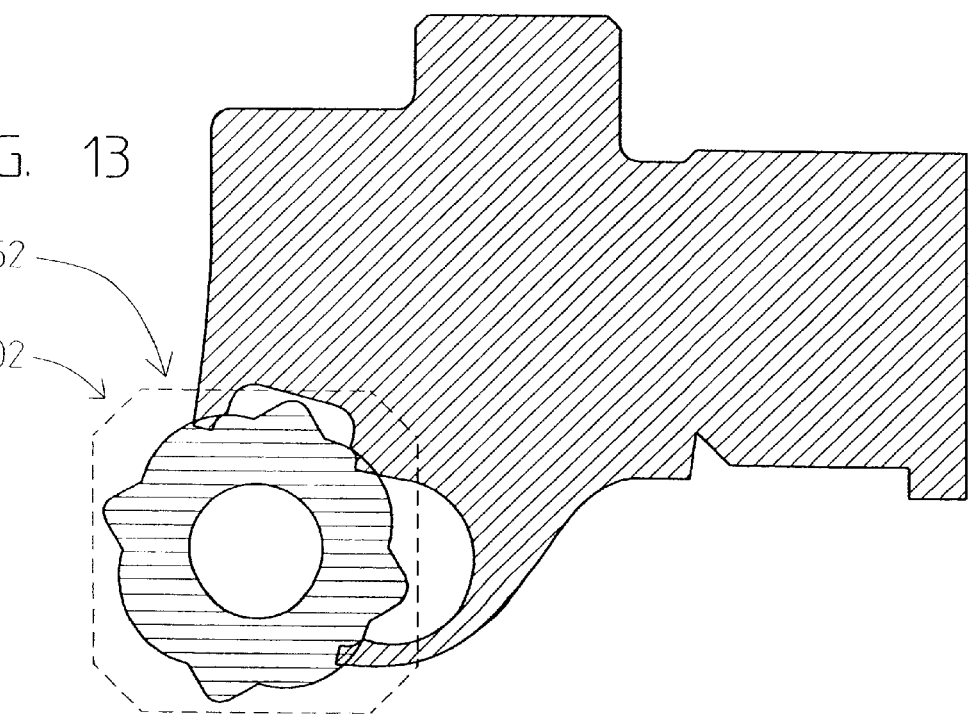

Turning now to FIGS. 9A–9F, these show a second cutting insert, generally designated 102, having n-fold (in this case 4-fold) rotational symmetry. Insert 102 is conceptually and structurally similar to insert 100, equivalent features being designated similarly. Insert 102 differs from insert 100 in that it is modified to provide a substantially 45° entering angle. Thus, as seen in FIG. 9E, the orientation of corner portions 112 is rotated by 30° clockwise relative to the geometry of the primary cutting edges. This provides the required entering angle of substantially 45° when mounted in pocket 52. as shown in FIG. 11. The effect of an attempt to mount cutting insert 102 incorrectly within pocket 52 is shown in FIG. 13.

Here too, the cutting geometry of insert 102 is, in itself, a conventional configuration for a 45° square insert.

At this stage, it will be clear that the features of cutting inserts 100 and 102 dictate additional geometrical requirements of pocket 52. Specifically, lateral relief hollows 74 and 76 must also be formed to accommodate support protrusions 114 of all members of the set of inserts with which pocket 52 is to he used.

Figure 14:
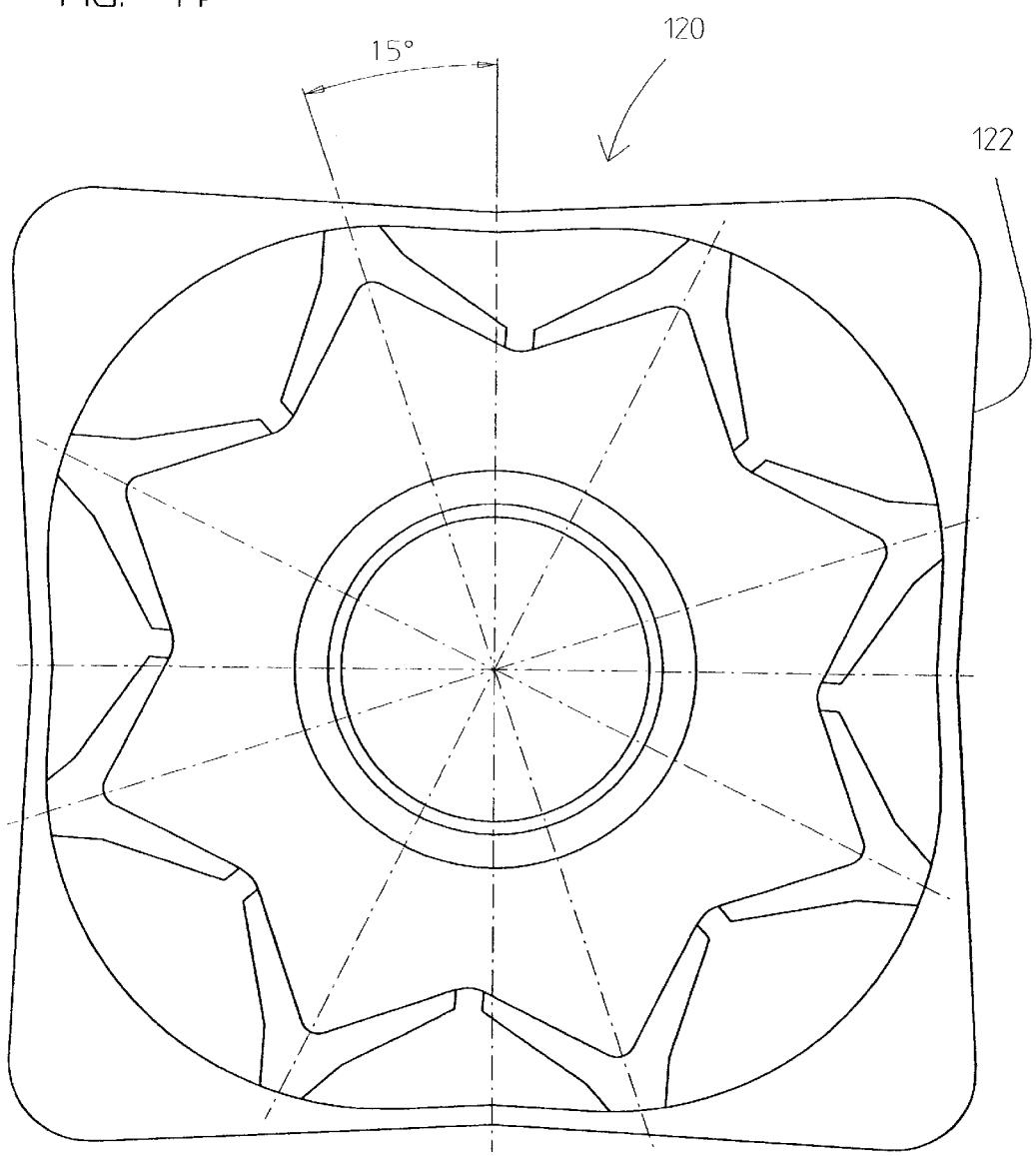
FIG. 14 is a bottom view of a variation of the cutting insert of FIG. 8A having a recessed cutting geometry.

It should be clear that the cutting tool assemblies of the present invention are not limited to cutting inserts with non-recessed cutting geometry. By way of example, FIG. 14 illustrates a cutting insert 120 similar to cutting insert 100 described above, but with a recessed cutting edge 122.

Figure 15:
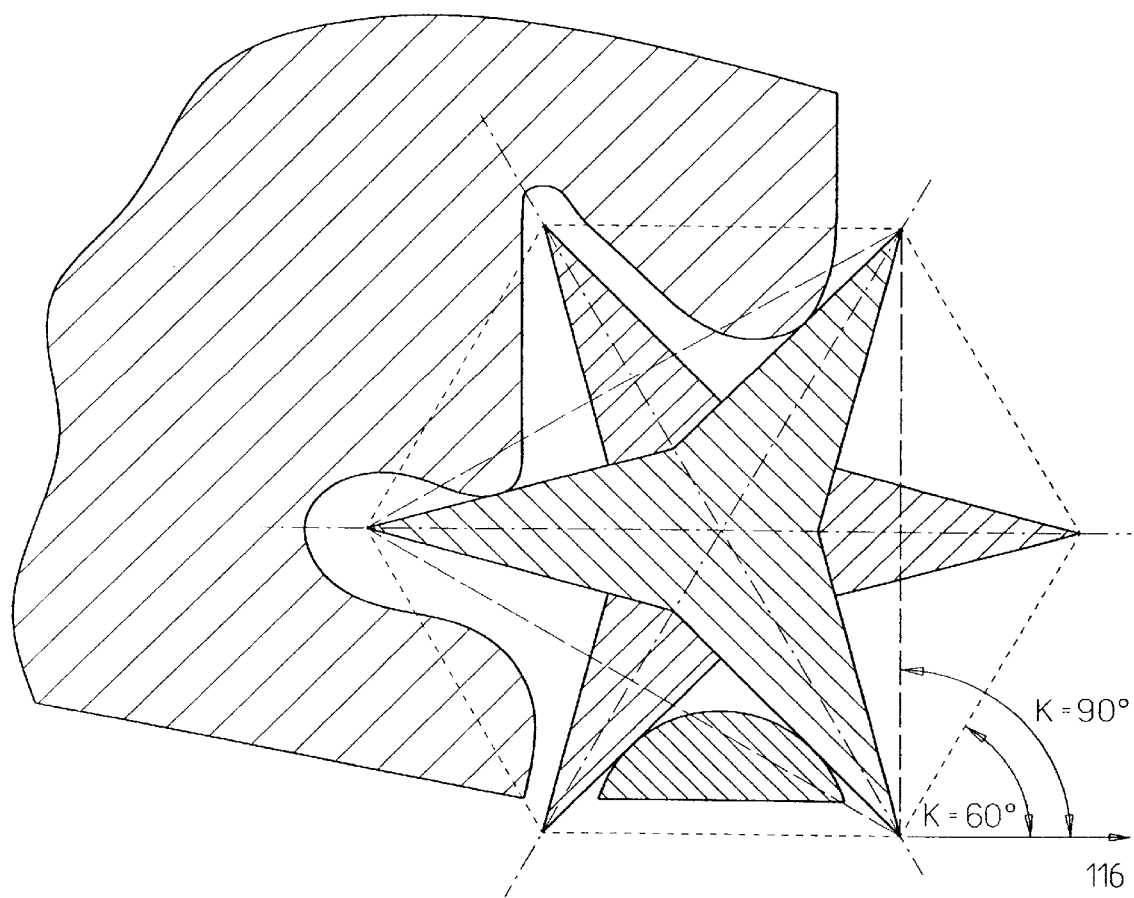
FIG. 15 is a schematic horizontal cross-sectional view showing the abutment geometry of a set of cutting inserts with triangular and hexagonal symmetry.
Figure 16:
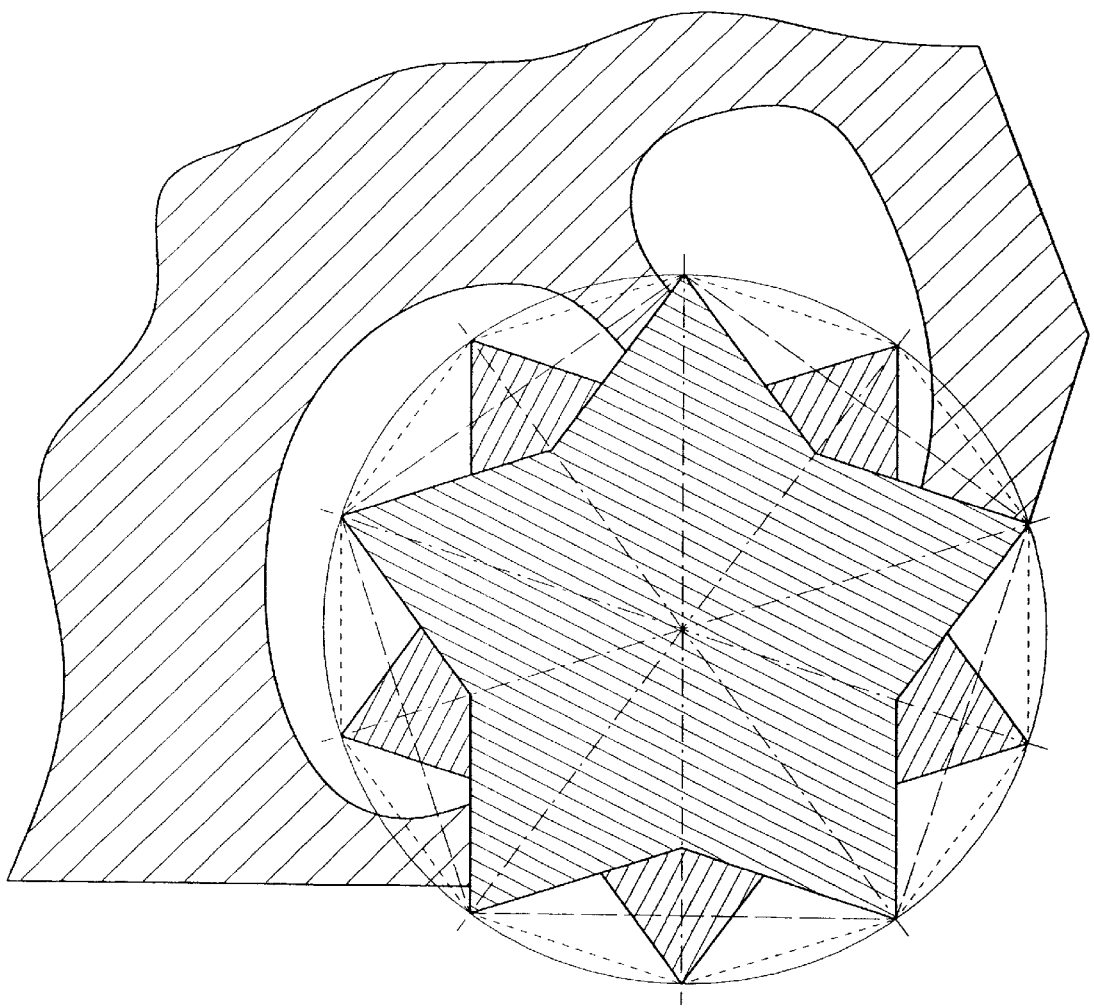
FIG. 16 is a schematic horizontal cross-sectional view showing the abutment geometry of a set of cutting inserts with pentagonal and decagonal symmetry.

As mentioned earlier, it is important to appreciate that the principles of the modular cutting insert assembly and corresponding pockets and cutting inserts of the present invention are not limited to the 4-fold and 8-fold symmetry set illustrated. By way of schematic illustration. FIGS. 15 and 16 show possible abutment geometry for sets of inserts with 3- and 6-fold symmetry, and 5- and 10-fold symmetry, respectively. In each case, the cutting geometry may be any desired cutting geometry of the appropriate symmetry. The base flank of the lower symmetry insert in each case may be either a regular configuration as shown, or a "fool proof" configuration having lateral support protrusions (not shown) functionally equivalent to protrusions 114 described above.

It should also be noted that each set of inserts may include more than two different levels of symmetry. For example, pocket 52 described above may, with minimal adaptation, also be used for an insert with 11-fold symmetry.

While the invention has been described by way of illustration with reference to certain specific embodiments, it will be understood that the embodiment and variations discussed are merely exemplary and that the invention may be carried out with many other mechanical modifications and adaptations, without departing from its spirit or exceeding the scope of the claims.

What is claimed is:

1. A tool holder for alternately receiving a first cutting insert indexable in exactly n rotational positions and a second cutting insert indexable in m×n rotational positions, for at least one value of each of n and m where n≧3 and m≧2, the tool holder comprising at least one insert receiving pocket defined with reference to an axis passing through said pocket with which a central axis of the cutting inserts is to be aligned, said pocket having:

(a) a base for supporting the cutting inserts;

(b) first, second and third lateral support surfaces angularly spaced around, and substantially equidistant from, said axis;

(c) a first lateral hollow located between said first and second lateral support surfaces; and (d) a second lateral hollow located between said second and third lateral support surfaces, wherein said first and second lateral hollows are formed such that, when one of the cutting inserts is mounted within said insert receiving pocket in a first position said first and second lateral support surfaces abut first and second portions of the cutting insert, respectively, and when the insert is rotated through 360°/(m×n) about said axis, the first and second portions of the insert lie within said first and second lateral hollows, respectively.

2. The tool holder of claim 1, wherein said first, second and third lateral support surfaces define, respectively, first, second and third planes, said first plane being related to said second plane by a rotation through 360°/n about said axis.

3. The tool holder of claim 2, wherein said second and third planes of said pocket are substantially coplanar.

4. The tool holder of claim 1, wherein n=4 and m=2.

5. A cutting insert having n-fold rotational symmetry for some value of n where n≧3, the cutting insert being indexable exclusively at n indexing stations within an insert receiving pocket which is configured to receive alternately cutting inserts having both n-fold rotational symmetry and m×n-fold rotational symmetry for some value of m where m≧2, the cutting insert comprising a unitary structure having an upper surface bounded by a cutting edge, a base, a peripheral flank surface and a central axis, wherein said peripheral flank surface is shaped such that an outline of a first cross-section taken through the lower part of the cutting insert perpendicular to said central axis exhibits a recessed form including:
(a) n corner portions angularly spaced around said central axis, said corner portions corresponding to n-fold rotationally symmetric lateral abutment features; and
(b) support protrusions protruding outwards from said peripheral flank surface between said corner portions,
wherein said support protrusions are shaped such that, when the cutting insert is positioned within the insert receiving pocket in a first position, a plurality of said corner portions abut support surfaces of the insert receiving pocket and, when the cutting insert is rotated through an angle of less than 360°/n about said central axis from said first position, contact of said support protrusions with the support surfaces of the insert receiving pocket interferes with seating of the insert within the insert receiving pocket.

6. The cutting insert of claim 5, wherein said peripheral flank surface is further shaped such that an outline of a second cross-section taken through the cutting insert perpendicular to said central axis and proximal to said upper surface exhibits a non-recessed form.

7. The cutting insert of claim 5, wherein said corner portions correspond substantially to corner regions of a regular polygon of n sides.

8. The cutting insert of claim 5, wherein said peripheral flank surface is further shaped such that an outline of a second cross-section taken through the cutting insert perpendicular to said central axis and proximal to said upper surface exhibits a recessed form.

9. The cutting insert of claim 5, wherein n=4 and m=2.

10. A modular cutting tool assembly comprising:
(a) the cutting insert of claim 5; and
(b) a tool holder having at least one insert receiving pocket for receiving the cutting insert, said pocket including:
(i) a base for supporting the cutting insert;
(ii) first, second and third lateral support surfaces configured for abutting a corresponding three of said lateral abutment features of the cutting insert;
(iii) a first lateral hollow located between said first and second lateral support surfaces for accommodating a first of said support protrusions; and
(iv) a second lateral hollow located between said second and third lateral support surfaces for accommodating a second of said support protrusions.

11. A modular cutting tool assembly comprising:
(a) a tool holder having at least one insert receiving pocket with a base and a plurality of lateral support surfaces;
(b) a first cutting insert receivable within said pocket, said first cutting insert having an upper surface, a bottom surface and a peripheral flank surface, said peripheral flank surface being configured to provide abutment features with m×n-fold rotational symmetry about a central axis of said first cutting insert such that said first cutting insert is configured to be restrained against said lateral support surfaces in any of m×n angular positions, for at least one value of each of n and in where n≧3 and m≧2; and
(c) a second cutting insert receivable within said pocket, said second cutting insert having an upper surface, a bottom surface and a peripheral flank surface, said peripheral flank surface being configured to provide reduced-symmetry abutment features with only n-fold rotational symmetry about a central axis of said second cutting insert such that said second cutting insert is configured to be restrained against said lateral support surfaces in only n angular positions,
wherein said peripheral flank surface of said first cutting insert is configured such that a lower cross-section taken through the lower part of said first cutting insert perpendicular to said central axis exhibits a recessed form.

12. The modular cutting tool assembly of claim 11, wherein said peripheral flank surface of said first cutting insert is configured such that an upper cross-section through said first cutting insert perpendicular to said central axis and proximal to said upper surface exhibits a non-recessed form.

13. The modular cutting tool assembly of claim 12, wherein said upper cross-section corresponds to a substantially regular polygon with m×n sides.

14. The modular cutting tool assembly of claim 12, wherein said upper cross-section is substantially circular.

15. The modular cutting tool assembly of claim 11, wherein said peripheral flank surface of said first cutting insert is configured such that an upper cross-section through said first cutting insert perpendicular to said central axis and proximal to said upper surface exhibits a recessed form.

16. The modular cutting tool assembly of claim 11, wherein said peripheral flank surface of said second cutting insert is shaped such that a lower cross-section taken through the lower part of said second cutting insert perpendicular to said central axis at a point closer to said bottom surface exhibits a recessed form.

17. The modular cutting tool assembly of claim 16, wherein said lower cross-section of said second cutting insert includes:
(a) n corner portions angularly spaced around said central axis, said corner portions corresponding to n-fold rotationally symmetric lateral abutment features; and
(b) support protrusions protruding outwards from said peripheral flank surface between said corner portions, said support protrusions being shaped such that, under any geometrical mapping of an outline of said corner portions by rotation through an angle of less than 360°/n about said central axis, said support protrusions extend beyond said outline.

18. The modular cutting tool assembly of claim 17, wherein said corner portions correspond substantially to corner regions of a regular polygon of n sides.

19. The modular cutting tool assembly of claim 16, wherein said peripheral flank surface of said second cutting insert is shaped such that an upper cross-section taken through said second cutting insert perpendicular to said central axis and proximal to said upper surface exhibits a non-recessed form.

20. The modular cutting tool assembly of claim 11, wherein said plurality of lateral support surfaces of said pocket include first, second and third lateral support surfaces, said lateral support surfaces being angularly spaced around, and substantially equidistant from, a central axis of said pocket, said pocket further including:

(a) a first lateral hollow located between said first and second lateral support surfaces; and (b) a second lateral hollow located between said second and third lateral support surfaces, wherein said first and second lateral hollows are formed such that geometrical mappings of said first and second lateral support surfaces by rotation through 360°/(m×n) about said axis lie within said first and second lateral hollows, respectively.

21. The modular cutting tool assembly of claim 20, wherein said first, second and third lateral support surfaces define, respectively, first, second and third planes, said first plane being related to said second plane by a rotation through 360°/n about said axis.

22. The modular cutting tool assembly, of claim 21, wherein said second and third planes are substantially coplanar.

23. The modular cutting tool assembly of claim 11, wherein n=4 and m=2.

24. A modular cutting tool assembly comprising:

(a) a tool holder having at least one insert receiving pocket with a base and a plurality of lateral support surfaces, and having a predetermined feed direction relative to said lateral support surfaces;

(b) a first cutting insert receivable within said pocket, said first cutting insert having an upper surface bounded by a cutting edge, a bottom surface and a peripheral flank surface, said peripheral flank surface being configured to provide abutment features with n-fold rotational symmetry about a central axis of said first cutting insert such that said first cutting insert is configured to be restrained against said lateral support surfaces in n angular positions, for at least one value of n where n≧3, said first cutting insert being configured such that, when mounted within said pocket, said first cutting insert presents a primary operative portion of said cutting edge at a first entering angle to said feed direction;

(c) a second cutting insert receivable within said pocket, said second cutting insert having an upper surface bounded by a cutting edge, a bottom surface and a peripheral flank surface, said peripheral flank surface being configured to provide abutment features with n-fold rotational symmetry about a central axis of said second cutting insert such that said second cutting insert is configured to be restrained against said lateral support surfaces in n angular positions, said second cutting insert being configured such that, when mounted within said pocket, said second cutting insert presents a primary operative portion of said cutting edge at a second entering angle to said feed direction, said second entering angle being different from said first entering angle.

25. The modular cutting assembly of claim 24, wherein said first entering angle differs from said second entering angle by about 180°/n.

26. The modular cutting assembly of claim 24, wherein n=4.

* * * * *